(12) United States Patent
Shiosaki et al.

(10) Patent No.: US 10,696,384 B2
(45) Date of Patent: *Jun. 30, 2020

(54) SELECTIVELY THRUSTING PROPULSION UNITS FOR AERIAL VEHICLES

(71) Applicant: Amazon Technologies, Inc., Seattle, WA (US)

(72) Inventors: Dominic Timothy Shiosaki, Seattle, WA (US); Ricky Dean Welsh, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 55 days.

This patent is subject to a terminal disclaimer.

(21) Appl. No.: 15/794,801

(22) Filed: Oct. 26, 2017

(65) Prior Publication Data

US 2018/0044004 A1 Feb. 15, 2018

Related U.S. Application Data

(63) Continuation of application No. 15/083,151, filed on Mar. 28, 2016, now Pat. No. 9,840,324.

(51) Int. Cl.
*B64C 27/14* (2006.01)
*B64C 39/02* (2006.01)
(Continued)

(52) U.S. Cl.
CPC ............ *B64C 27/14* (2013.01); *B64C 11/46* (2013.01); *B64C 27/57* (2013.01); *B64C 39/024* (2013.01);
(Continued)

(58) Field of Classification Search
CPC ......... B64C 27/14; B64C 11/46; B64C 27/57; B64C 39/024; B64C 2201/027; B64C 2201/108
See application file for complete search history.

(56) References Cited

U.S. PATENT DOCUMENTS 3,059,876 A    10/1962  Platt
3,228,479 A     1/1966  Nagler
(Continued)

FOREIGN PATENT DOCUMENTS

CN    103879555 A    6/2014
CN    203902837 U   10/2014
(Continued)

OTHER PUBLICATIONS

International Search Report and Written Opinion for PCT Application No. PCT/US2017/023257 dated Jun. 21, 2017.
(Continued)

*Primary Examiner* — Michael D Lang
(74) *Attorney, Agent, or Firm* — Athorus, PLLC

(57) ABSTRACT

Aerial vehicles may include propulsion units having motors with drive shafts that may be aligned at a variety of orientations, propellers with variable pitch blades, and common operators for aligning the drive shafts at one or more orientations and for varying the pitch angles of the blades. The common operators may include plate elements to which a propeller hub is rotatably joined, and which may be supported by one or more linear actuators that may extend or retract to vary both the orientations of the drive shafts and the pitch angles of the blades. Operating the motors and propellers at varying speeds, gimbal angles or pitch angles enables the motors to generate forces in any number of directions and at any magnitudes. Attributes of the propulsion units may be selected in order to shape or control the noise generated thereby.

20 Claims, 23 Drawing Sheets

(51) Int. Cl.
  *B64C 27/57* (2006.01)
  *B64C 11/46* (2006.01)
(52) U.S. Cl.
  CPC .. *B64C 2201/027* (2013.01); *B64C 2201/108* (2013.01)

(56) References Cited

U.S. PATENT DOCUMENTS

| | | | |
|---|---|---|---|
| 5,505,407 | A | 4/1996 | Chiappetta |
| 5,746,390 | A | 5/1998 | Chiappetta |
| 5,941,478 | A | 8/1999 | Schmittle |
| 6,568,630 | B2 | 5/2003 | Yoeli |
| 6,886,776 | B2 | 5/2005 | Wagner et al. |
| 7,159,817 | B2 | 1/2007 | VanderMey et al. |
| 7,472,863 | B2 | 1/2009 | Pak |
| 7,874,512 | B2 | 1/2011 | Xu |
| 8,016,226 | B1 | 9/2011 | Wood |
| 8,544,787 | B2 | 10/2013 | Lee et al. |
| D696,618 | S | 12/2013 | Wang |
| 8,616,492 | B2 | 12/2013 | Oliver |
| 8,646,720 | B2 | 2/2014 | Shaw |
| 8,708,273 | B2 | 4/2014 | Oliver |
| 8,733,690 | B2 | 5/2014 | Bevirt et al. |
| 8,800,912 | B2 | 8/2014 | Oliver |
| 8,827,200 | B2 | 9/2014 | Radu |
| 8,903,568 | B1 | 12/2014 | Wang et al. |
| 9,045,226 | B2 | 6/2015 | Piasecki et al. |
| 9,046,148 | B2 | 6/2015 | Welsh |
| 9,108,728 | B2 | 8/2015 | Shaw |
| 9,187,174 | B2 | 11/2015 | Shaw |
| 2003/0062443 | A1 | 4/2003 | Wagner et al. |
| 2003/0080242 | A1 | 5/2003 | Kawai |
| 2004/0026563 | A1 | 2/2004 | Moller |
| 2005/0242231 | A1 | 11/2005 | Yoeli |
| 2006/0226281 | A1 | 10/2006 | Walton |
| 2010/0224723 | A1 | 9/2010 | Apkarian |
| 2011/0042507 | A1 | 2/2011 | Seiford |
| 2012/0261523 | A1 | 10/2012 | Shaw |
| 2016/0059958 | A1 | 3/2016 | Kvitnevskiy |
| 2016/0083073 | A1 | 3/2016 | Beckman |
| 2016/0129998 | A1 | 5/2016 | Welsh et al. |
| 2017/0057630 | A1 | 3/2017 | Schwaiger |

FOREIGN PATENT DOCUMENTS

| | | |
|---|---|---|
| EP | 1232943 A3 | 2/2002 |
| EP | 2990332 A1 | 3/2016 |
| WO | 2013098736 A2 | 7/2013 |
| WO | 2013098736 A3 | 7/2013 |
| WO | 2015124556 A1 | 8/2015 |

OTHER PUBLICATIONS

Search Report dated Jul. 25, 2019, for corresponding CN Application No. 201780022766.1.

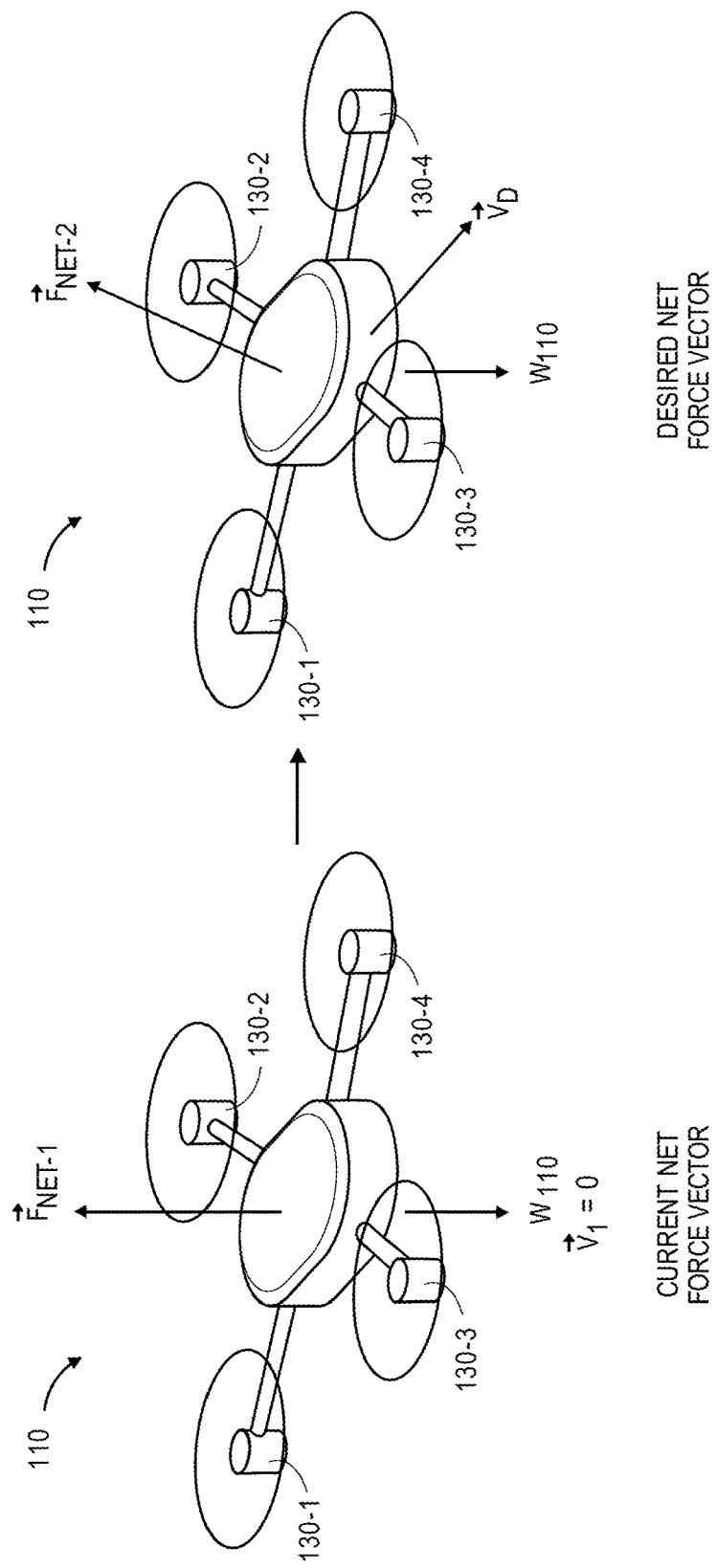

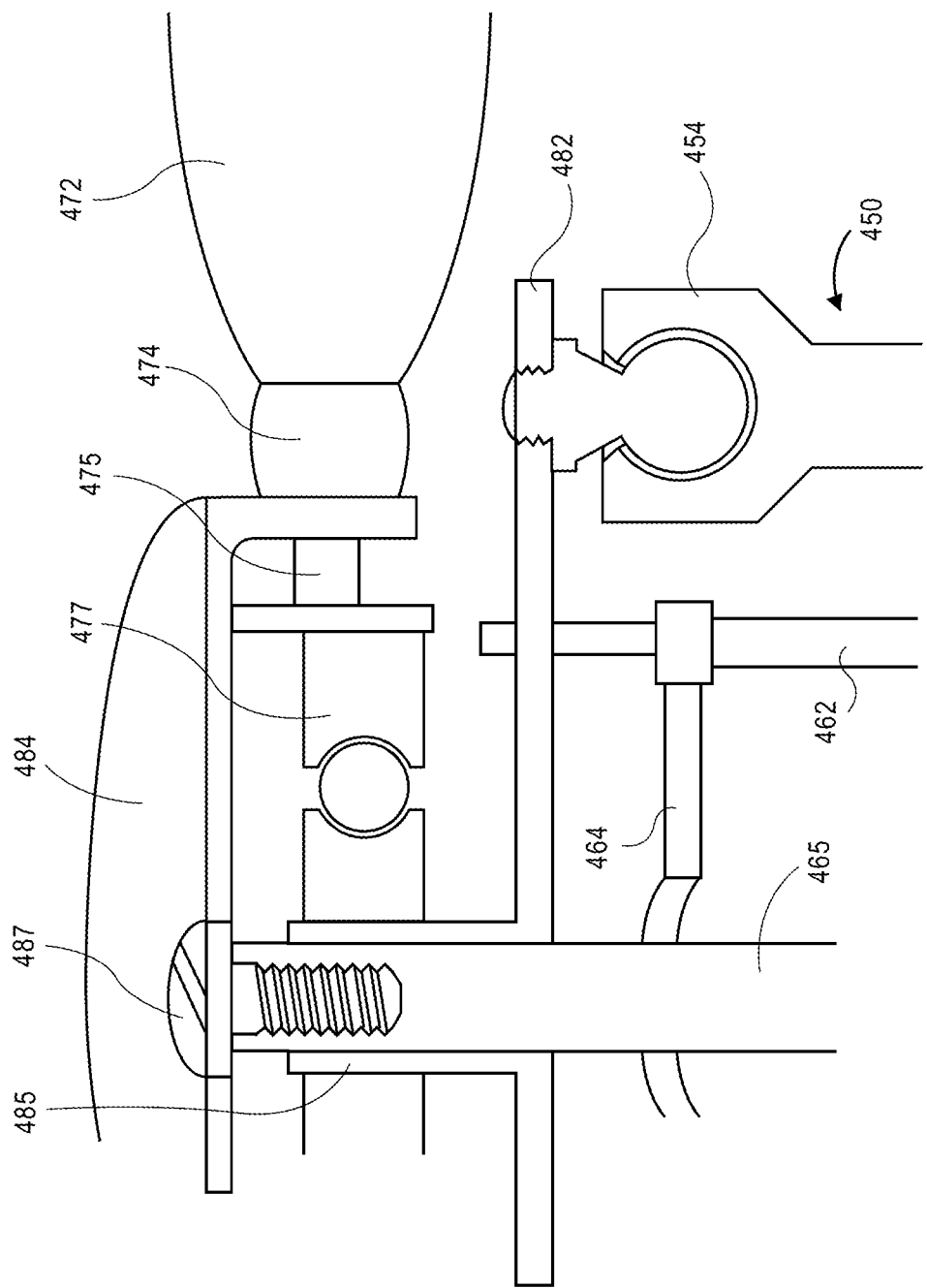

CHANGE BLADE PITCH: MOVE ALL ACTUATORS IN CONCERT

CHANGE FORCE ANGLE: MOVE ACTUATORS SEPARATELY

CHANGE FORCE ANGLE: MOVE ACTUATORS SEPARATELY

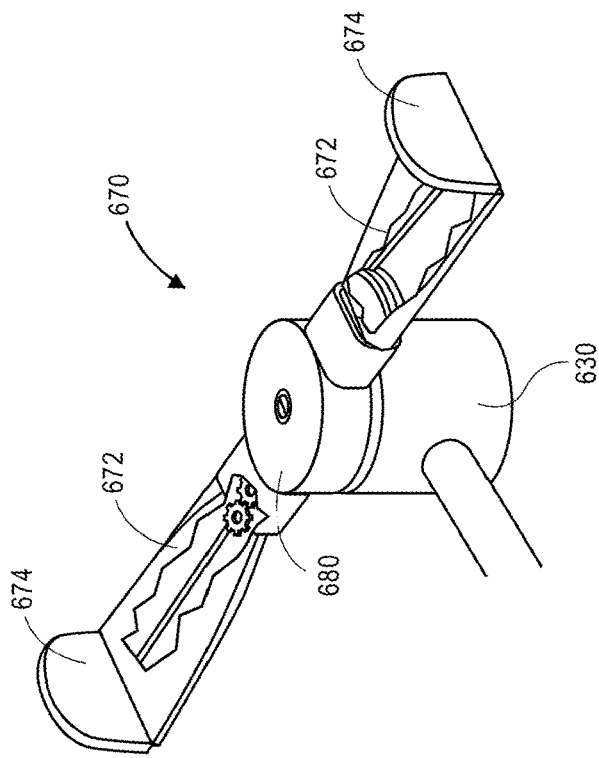
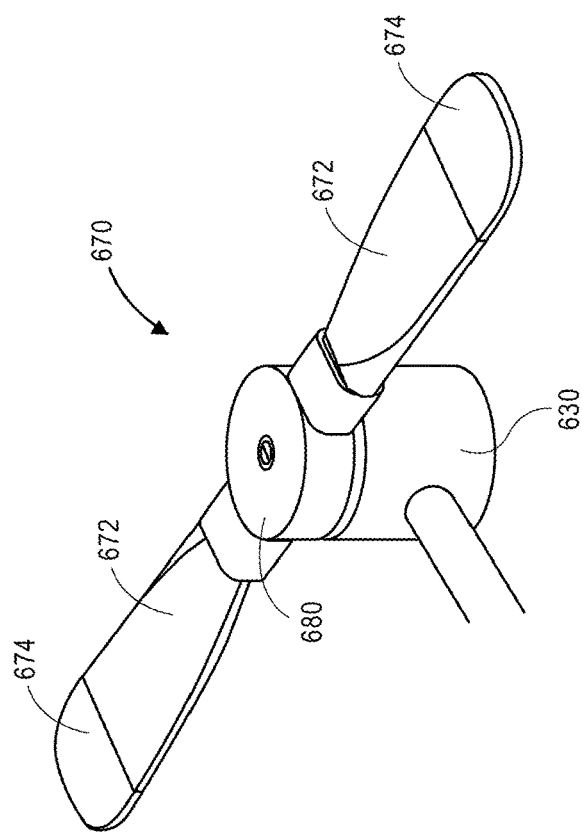
FIG. 6B
FIG. 6A

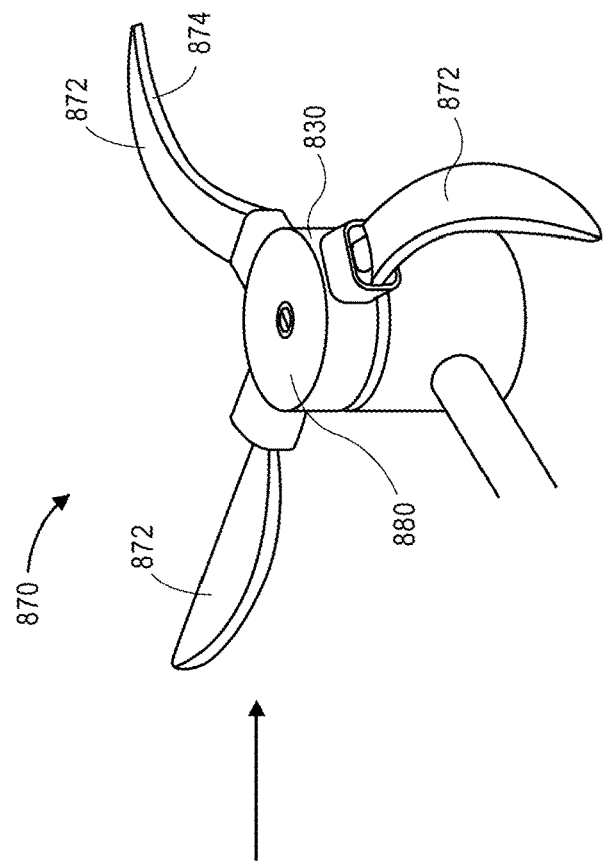
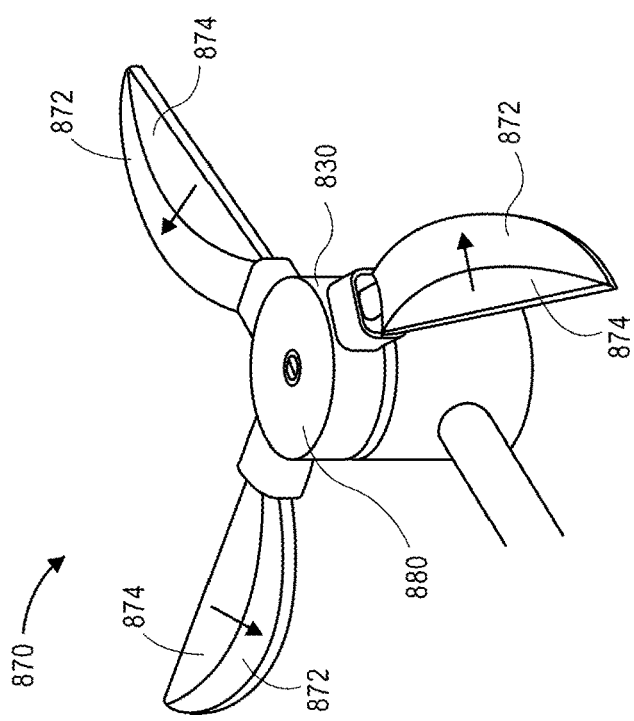

SELECTIVELY THRUSTING PROPULSION UNITS FOR AERIAL VEHICLES

CROSS-REFERENCE TO RELATED APPLICATIONS

This application is a continuation of U.S. patent application Ser. No. 15/083,151, now U.S. Pat. No. 9,840,324, filed Mar. 28, 2016, the contents of which are incorporated by reference herein in their entirety.

BACKGROUND

The use of unmanned aerial vehicles such as airplanes or helicopters having one or more propellers in a variety of applications is increasingly common. Such vehicles may include fixed-wing aircraft, or rotary wing aircraft such as quad-copters (e.g., a helicopter having four rotatable propellers), octo-copters (e.g., a helicopter having eight rotatable propellers) or other vertical take-off and landing (or VTOL) aircraft having one or more propellers. In most unmanned aerial vehicles, each of the propellers is powered by one or more rotating motors or other prime movers. The motors and propellers may be provided in propulsion units or modules that are physically joined to a frame or other structure of an unmanned aerial vehicle, e.g., a fuselage, a wing, or another portion of the vehicle, and electrically and/or mechanically coupled to one or more other systems or components, including but not limited to computer-implemented control systems or modules. The net effects of the operation of such propulsion units cause an unmanned aerial vehicle to travel in one or more directions and/or be held aloft thereby.

Propulsion units that are outfitted to unmanned aerial vehicles typically include motors having shafts with fixed axes of orientation and propellers of fixed shapes, with the motors being configured to rotate the propellers about the fixed axes of orientation by the shafts. Typically, a level of force (e.g., lift and/or thrust) provided by a propulsion unit having a motor and a propeller may be modified either by varying a speed of the motor within a safe operating range (e.g., from a full stop condition to a maximum rotational or angular velocity), or by varying pitch angles (or angles of attack) of blades of the propeller. Propulsion units that are outfitted to unmanned aerial vehicles are typically not configured, however, to change either their respective gimbal angles, e.g., angles of their axes of orientation about which the propellers rotate, and along which the propulsion units are configured to generate force, or the shapes of their respective propellers, during operation.

Sound is kinetic energy released by vibrations of molecules in a medium, such as air. In industrial applications, sound may be generated in any number of ways or in response to any number of events. For example, sound may be generated in response to vibrations resulting from impacts or frictional contact between two or more bodies. Sound may also be generated in response to vibrations resulting from the rotation of one or more bodies such as shafts, e.g., by motors or other prime movers. Sound may be further generated in response to vibrations caused by fluid flow over one or more bodies. In essence, any movement of molecules, or contact between molecules, that causes a vibration may result in the emission of sound at a pressure level or intensity, and at one or more frequencies. Properties of sound emitted by unmanned aerial vehicles during operation (e.g., sound pressure levels or frequency spectrums of such sounds) are determined based on operating characteristics of the aerial vehicles, such as motor speeds or attributes of the propellers rotated thereby.

BRIEF DESCRIPTION OF THE DRAWINGS

FIGS. 1A through 1F are views of aspects of an aerial vehicle having one or more embodiments of the propulsion units in accordance with embodiments of the present disclosure.

FIGS. 4A through 4F are views of aspects of an embodiment of a propulsion unit in accordance with embodiments of the present disclosure.

FIGS. 6A and 6B are views of aspects of an embodiment of a propulsion unit in accordance with embodiments of the present disclosure.

FIGS. 8A and 8B are views of aspects of an embodiment of a propulsion unit in accordance with embodiments of the present disclosure.

DETAILED DESCRIPTION

Figure 1A:
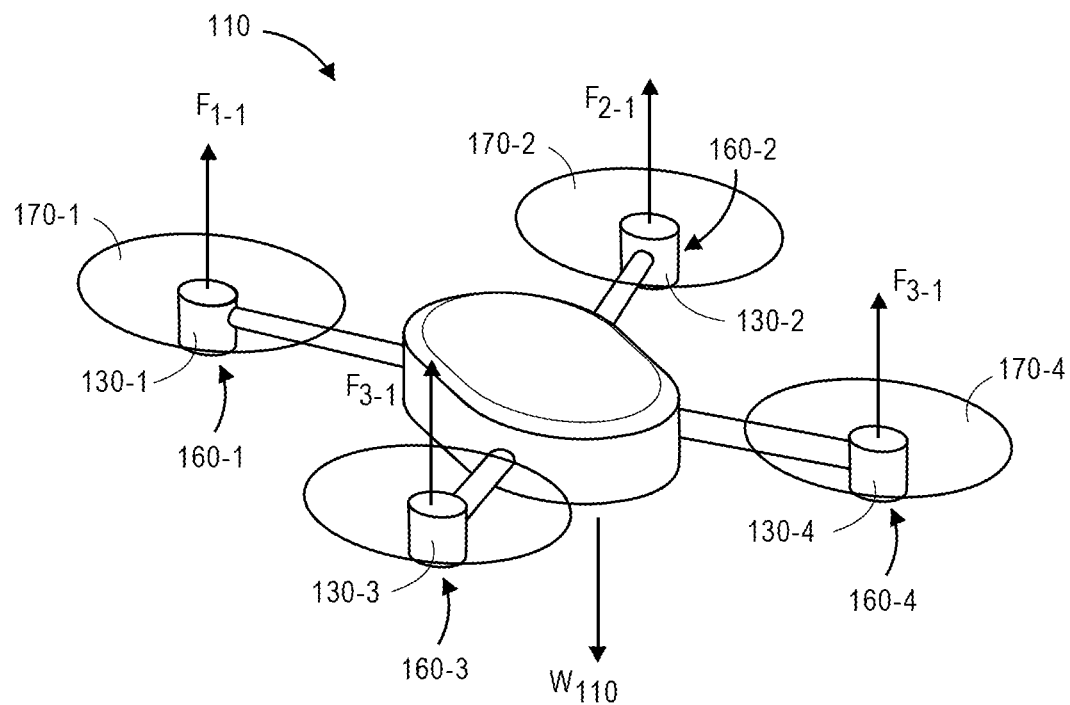

As is set forth in greater detail below, the present disclosure is directed to aerial vehicles having propulsion units that may be selectively operated in order to achieve a desired level of thrust or lift in a desired direction while emitting sounds at desired sound pressure levels (or intensities) and within desired frequency spectrums. The propulsion units may include one or more motors and one or more propellers, along with components for varying a level and direction of thrust or lift generated by such units in any number of ways, such as by varying a gimbal angle of the propulsion units, varying a speed of a motor for rotating a propeller, or varying a pitch angle or shape of one or more blades of the propeller. Because factors such as motor or propeller speed, gimbal angle, pitch angle or blade shape have direct effects on forces generated by an operating propulsion unit, sounds radiated by the operating propulsion unit, or directions in which such forces or sounds are directed, the capacity to manipulate such speeds, angles or shapes enables aerial vehicles having propulsion units of the present disclosure to control aspects of such forces (e.g., magnitudes or directions) or sounds (e.g., sound pressure levels or frequency spectrums), including but not limited to regions in which such sounds are heard by one or more humans or other animals. Thus, where force (e.g., lift and/or thrust) in a given amount and/or direction is demanded from a propulsion unit of the present disclosure or an aerial vehicle to which the propulsion unit is outfitted, speeds of a motor or propeller, gimbal angles, pitch angles or blade shapes may be individually adjusted, as necessary, to generate and radiate a specific or desired sound in a selected direction while satisfying a demand for the force. Where an aerial vehicle includes two or more of such propulsion units, each of the propulsion units may be independently operated to generate specific or desired sounds while generating forces in specific amounts or directions.

In some embodiments of the present disclosure, the propulsion units may include linear actuators that are configured to modify not only gimbal angles (e.g., the angles of the axes about which propellers are rotated and, therefore, axes corresponding to directions of forces generated thereby) of the propulsion units but also pitch angles of the respective blades provided on each of the propellers. For example, a propulsion unit may include a hub or bearing ring to which blades of a propeller are rotatably mounted to a housing by their respective roots via one or more pivotable connectors provided within the hub or bearing ring. The propulsion unit may also include a motor assembly having a motor to which the propeller itself is mounted via a drive shaft that defines an axis, and a planar element or plate provided in association with the hub or bearing ring. The planar element or plate may include a necked bore or other extension through which the drive shaft extends in sliding contact, as well as one or more joints associated with the rotatable connectors of the hub or bearing ring. The motor assembly may be mounted to a base within the housing by a gimbaling mechanism that enables the motor assembly to pivot freely about a point on the base while enabling the motor to rotate the propeller about an axis defined by the motor. The pivotable connectors may be configured to cause the blades to pivot about their respective roots to predetermined extents, determined as a function of relative motion or distances between the planar element or plate and the hub or bearing ring. Thus, the planar element or plate acts a common operator which may be repositioned (e.g., along an axis of a drive shaft of the motor) or reoriented (e.g., an angle of a plane defined by the planar element or plate, aligned substantially perpendicular to the drive shaft) in order to vary both pitch angles of the blades, and a gimbal angle of the propulsion unit, using the linear actuators.

In some embodiments, the linear actuators that are joined to the planar element or plate may retract or be extended singularly or in concert. The retraction or extension of the linear actuators at specific points on the planar element causes an angle of a plane of the planar element or plate to vary. Where the drive shaft is slidably inserted into the necked bore substantially perpendicularly, and where the motor assembly is pivotably joined to a gimbaling mechanism on a base within the housing, varying the angle of the plane of the planar element necessarily causes an angle of the axis or a gimbal angle of the propulsion unit to vary accordingly. Additionally, the retraction or extension of the linear actuators may also cause a relative position of the hub or bearing ring to vary with respect to the planar element or plate, thereby repositioning the one or more pivotable connectors to which the roots of the blades are mounted, and causing the pitch angles of the blades to change accordingly. Preferably, the linear actuators may be joined to the planar element or plate at three or more locations about the element or plate, thereby enabling such linear actuators to positively control both an angle of a plane of the planar element or plate, and a relative position of the planar element or plate, ensuring that the pitch angles of the blades and the gimbal angle of the propulsion unit are oriented as desired based on axial movements and angular alignments of a common operator, e.g., the planar element of the plate.

Accordingly, the propulsion units of the present disclosure may be operated in a manner that specifically controls both a magnitude and a direction of a net force applied to an aerial vehicle by such propulsion units, including not only magnitudes but also directions of forces supplied by each of the respective propulsion units, based on independent variables such as a motor or propeller speed, a gimbal angle, a blade pitch angle or a blade shape. Some embodiments may include a plurality of linear actuators that may be operated separately or in concert to vary both the gimbal angle and the blade pitch angles of such propulsion units accordingly by repositioning or realigning a common operator. Some embodiments may also include motors that may be operated at variable speeds and/or propellers that have blades with varying shapes. The propulsion units of the present disclosure may be configured to modify one or more of such variables during operation, and, therefore, to control or shape the properties of sounds radiating therefrom.

Referring to FIGS. 1A through 1F, an aerial vehicle 110 having a plurality of propulsion units 130-1, 130-2, 130-3, 130-4 is shown. As is shown in FIG. 1A, each of the propulsion units 130-1, 130-2, 130-3, 130-4 generates a force $F_{1-1}, F_{2-1}, F_{3-1}, F_{4-1}$ to counteract a weight $w_{110}$ of the aerial vehicle 110 or other external forces acting on the aerial vehicle 110 (not shown). Each of the propulsion units 130-1, 130-2, 130-3, 130-4 includes a motor assembly 160-1, 160-2, 160-3, 160-4 having motors and one or more actuators and components for controlling the operation of the respective units 130-1, 130-2, 130-3, 130-4 within housings thereof, and a propeller 170-1, 170-2, 170-3, 170-4 provided external to such housings. The motor assemblies 160-1, 160-2, 160-3, 160-4 and the propellers 170-1, 170-2, 170-3, 170-4 may be selectively operated in order to determine, vary or select both the magnitudes and the directions of the forces $F_{1-1}, F_{2-1}, F_{3-1}, F_{4-1}$ generated thereby.

The motors provided within the motor assemblies 160-1, 160-2, 160-3, 160-4, may be any type or form of motor (e.g., electric, gasoline-powered or any other type of motor) capable of generating sufficient rotational speeds of the corresponding propellers 170-1, 170-2, 170-3, 170-4 to provide lift and/or thrust forces to the aerial vehicle 110 and any engaged payload, and to aerially transport the engaged payload thereby. For example, one or more of the motor assemblies 160-1, 160-2, 160-3, 160-4 may include a brushless direct current (DC) motor such as an outrunner brushless motor or an inrunner brushless motor.

Each of the motor assemblies 160-1, 160-2, 160-3, 160-4 may be similar or identical to one another, and may feature similar or identical features (e.g., power sources, numbers of poles, whether the motors included therein are synchronous or asynchronous) or operational capacities (e.g., angular velocities, torques, operating speeds or operating durations). Alternatively, two or more of the motor assemblies 160-1, 160-2, 160-3, 160-4 of the aerial vehicle 110 may include motors having different features or capacities, based on an extent to which use of such motors or their corresponding propellers 170-1, 170-2, 170-3, 170-4 is desired or required. Each of such motor assemblies 160-1, 160-2, 160-3, 160-4 may be operated individually or in tandem with one another, for any purpose. For example, two or more of the motor assemblies 160-1, 160-2, 160-3, 160-4 and their corresponding propellers 170-1, 170-2, 170-3, 170-4 may be operated to provide both lift and thrust, while two or more of the motor assemblies 160-1, 160-2, 160-3, 160-4 and their corresponding propellers 170-1, 170-2, 170-3, 170-4 may be operated to provide either lift or thrust, and in any desired angle or direction.

Figure 1B:
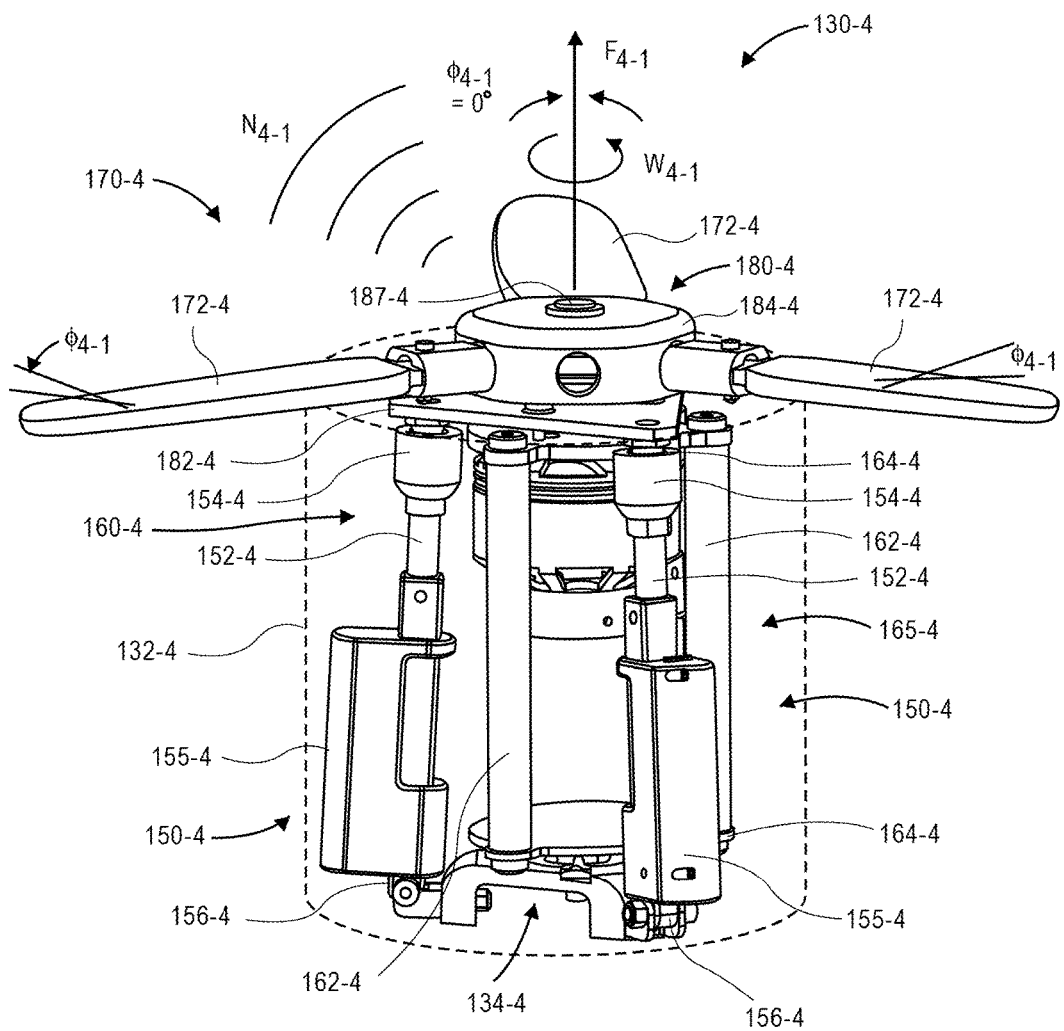
Figure 1C:
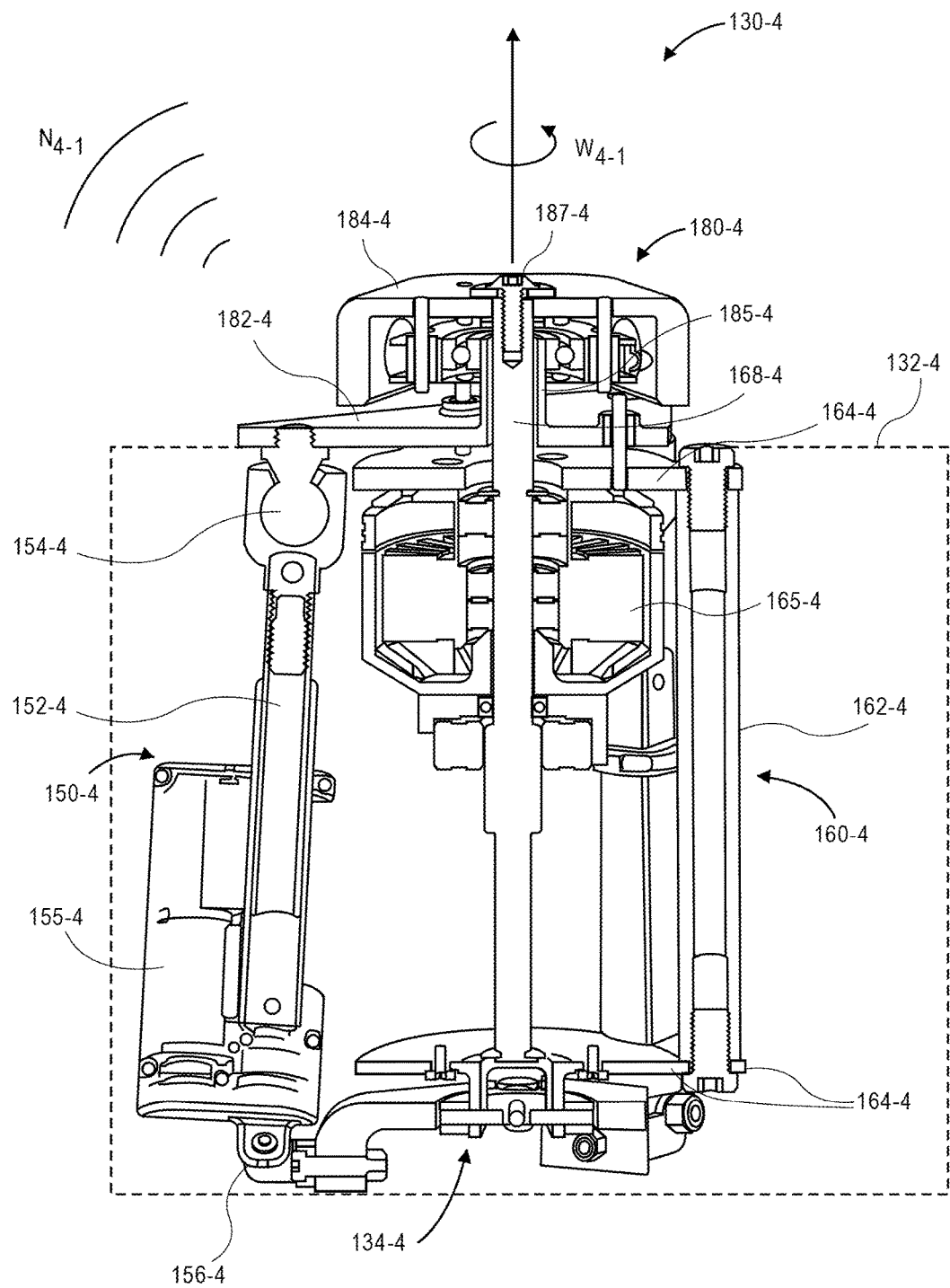

A view of internal components and other aspects of the propulsion unit 130-4 is shown in FIG. 1B and FIG. 1C. For example, as is shown in FIG. 1B and FIG. 1C, the propulsion unit 130-4 includes a housing 132-4, the motor assembly 160-4, the propeller 170-4 and a variable pitch hub 180-4. The propeller 170-4 includes a plurality of blades 172-4 joined to the variable pitch hub 180-4 via rotatable linkages 175-4 within a housing 184-4. The motor assembly 160-4 is provided within the housing 132-4 of the propulsion unit 130-4 and is mounted to a gimbaling base 134-4 (e.g., a surface within the housing 132-4 comprising a gimbaling mechanism) within the housing 132-4. The motor assembly 160-4 includes a plurality of support bars 162-4 extending between a pair of support plates 164-4 to define a frame, and a motor 165-4 coupled to a proximal end of a drive shaft 168-4. The motor 165-4 is configured to rotate the shaft 168-4 about an axis provided at a gimbal angle $\phi_{4-1}$. A distal end of the shaft 168-4 is coupled to the variable pitch hub 180-4, which is provided external to the housing 132-4 of the propulsion unit 130-4, via a fastener 187-4. The rotation of the shaft 168-4 causes the propeller 170-4 to rotate about the axis upon operation of the motor 165-4. The propulsion unit 130-4 further includes a plurality of plate supports 150-4. Each of the plate supports 150-4 includes a shaft 152-4 that is joined to a plate element 182-4 via ball joints (or other pivotable connectors) 154-4 and to the gimbaling base 134-4 via knuckle joints (or other pivotable connectors) 156-4. Each of the plate supports 150-4 further includes a linear actuator 155-4 that may extend or retract, independently or in concert, e.g., in response to one or more computer-generated control signals or instructions, to vary either an angle of the plate element 182-4 to which each is joined, a relative position of the plate element 182-4 with respect to the housing 184-4, or both the angle of the plate element 182-4 and the relative position of the plate element 182-4 with respect to the housing 184-4.

As is shown in FIG. 1B and FIG. 1C, the plate supports 150-4 are mounted to the plate element 182-4 at three locations. Additionally, the plate element 182-4 further includes a necked bore 185-4 through which the shaft 168-4 slidably extends. The necked bore 185-4 is aligned substantially perpendicular to a plane of the plate element 182-4, such that varying a planar angle of the plate element 182-4 causes an angle of the necked bore 185-4, substantially perpendicular to the plate element 182-4, and the shaft 168-4, to vary accordingly. Therefore, operating the linear actuators 155-4 to extend or retract the plate supports 150-4 causes a corresponding location of the plate element 182-4 to be raised or lowered within the housing 132-4, and at least one of the planar angle of the plate element 182-4 or a relative distance between the plate element 182-4 and the housing 184-4 to be varied accordingly.

As is also shown in FIG. 1B and FIG. 1C, the propeller 170-4 includes three blades 172-4 that are mounted to the rotatable linkages 175-4 within the housing 184-4 of the variable pitch hub 180-4, each at a blade pitch angle $\theta_{4-1}$. The variable pitch hub 180-4 is rotatably joined to the shaft 168-4 and enabled to rotate freely with respect to the plate element 182-4 about an axis defined by the shaft 168-4. The variable pitch hub 180-4 includes a ring bearing 177-4 provided between the rotatable linkages 175-4 and the necked bore 185-4 within the housing 184-4, enabling a relative distance between the housing 184-4 and the plate element 182-4 to vary accordingly as the plate element 182-4 moves with respect to the variable pitch hub 180-4. Where the rotatable linkages 175-4 are configured to rotate the blades 172-4 based on the relative distance between the housing 184 and the plate element 184-4, changes in the relative distance that are caused by extensions or retractions of one or more of the linear actuators 155-4 may thus cause changes in the blade angles of the respective blades 172-4.

Moreover, the propulsion unit 130-4 may include one or more sets of bearings coupled to the shaft 168-4 or other structural components. For example, as is shown in FIG. 1C, the ring bearing 177-4 is provided between the rotatable linkages 175-4 and the necked bore 185-4. A set of bearings (not shown) may also be provided between the variable pitch hub 180-4 and the plate element 182-4, to enable the variable pitch hub 180-4 to freely rotate about the axis defined by the shaft 168-4 while the plate element 182-4 remains fixed in position. Other sets of bearings (not shown) may be provided between the motor assembly 160-4 and the shaft 168-4, or between the shaft 168-4 and the propeller 170-4, for example, to enable the shaft 168-4 to freely rotate while also being secured into place and aligned along a predefined axis.

The various components of the propellers of the present disclosure, including but not limited to the blades 172-4, may be formed from any suitable materials that may be selected based on an amount of lift that may be desired in accordance with the present disclosure. In some implementations, aspects of the propeller 170-4, e.g., the blades 172-4, may be formed from one or more plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some implementations, the aspects of the propeller 170-4 may be formed of one or more lightweight materials including but not limited to carbon fiber, graphite, machined aluminum, titanium or fiberglass.

As is shown in FIG. 1B and FIG. 1C, the motor 165-4 rotates the shaft 168-4 and the propeller 170-4 at an angular velocity $\omega_{4-1}$, thereby generating a force $F_{4-1}$ in a direction of a gimbal angle $\phi_{4-1}$ of the propulsion unit 130-4, and causing sounds $N_{4-1}$ to radiate from the propulsion unit 130-4, e.g., in one or more frequency spectrums. The gimbal angle $\phi_{4-1}$ of the propulsion unit 130-4 shown in FIG. 1B and FIG. 1C is generally defined by an angle of the shaft 168-4, viz., zero degrees, or vertically normal, with respect to the gimbaling base 134-4.

Each of the linear actuators 155-4 is configured to cause the plate supports 150-4 to independently recall or repulse a common operator, viz., the plate element 182-4, at each of the points to which the plate supports 150-4 are mounted, and to change the gimbal angle of the propulsion unit 130-4 and/or the blade pitch angle of the blades 172-4 accordingly. For example, where each of the linear actuators 155-4 is operated in concert, and by a common extent (e.g., where each of the plate supports 150-4 extends or retracts by an equal amount, simultaneously or at different times), a change in a relative position of the plate element 182-4 with respect to the housing 184-4 will result, causing each of the blades 172-4 of the propeller 170-4 to change accordingly. Where each of the linear actuators 155-4 is operated independently, and by a unique extent (e.g., where each of the plate supports 150-4 extends or retracts by a different amount, either simultaneously or at different times), changes in relative positions of portions of the plate element 182-4 with respect to the housing 184-4 will cause the gimbal angle of the propulsion unit 130-4, defined by the angle of the shaft 168-4 with respect to the housing 132-4, to vary by a positive amount with respect to normal. In some embodiments, a gimbal angle of the propulsion unit 130-4 may be varied within a range of zero to fifteen degrees (0-15°) with respect to normal. The extent to which the gimbal angles may be varied is not limited, however.

Thus, because the shaft 168-4 slidably extends through the necked bore 185-4, and because the motor assembly 160-4 is pivotably mounted to the gimbaling base 134-4, varying an angle of the plate element 182-4 using the linear actuators 155-4 causes an axis of the shaft 168-4 to vary, thereby modifying the gimbal angle of the propulsion unit 130-4. Moreover, in addition to extensions or retractions of the plate supports 150-4, those of ordinary skill in the pertinent arts will recognize that speeds of the motor assembly 160-4 may also be modified accordingly. In some other embodiments, shapes of the blades 172-4 may also be modified accordingly.

As is discussed above, changes in blade pitch angles, gimbal angles, motor speeds and/or blade shapes of one or more propulsion units of an aerial vehicle may also result in changes to the forces generated by such propulsion units, or the overall net force provided to the aerial vehicle by such propulsion units. Therefore, where a change in position, velocity or acceleration of an aerial vehicle is desired, pitch angles, gimbal angles, motor speeds or blade shapes may be adjusted accordingly, in order to vary the a force (e.g., lift and/or thrust) supplied to the aerial vehicle by one or more of such propulsion units, and effect the desired change in position, velocity and/or acceleration accordingly.

Referring to FIG. 1D and FIG. 1E, the aerial vehicle 110 is shown as free body diagrams with respect to a current net force vector and a desired net force vector. For example, referring to FIG. 1D, where the aerial vehicle 110 is to hover, a magnitude of the net force $F_{NET-1}$ provided by the operation of the propulsion units 130-1, 130-2, 130-3, 130-4 must equal a magnitude of the weight $w_{110}$ of the aerial vehicle 110, in an opposite direction, excluding the effects of wind forces or other lateral effects, such that a velocity $v_1$ of the aerial vehicle 110 is zero, in order to cause the aerial vehicle 110 to hover. Where a change in position, velocity and/or acceleration is desired, however, the net force provided by the operation of the propulsion units 130-1, 130-2, 130-3, 130-4 must change accordingly. For example, referring to FIG. 1E, in order cause the aerial vehicle 110 to transition from a hovering state at a velocity $v_1$ of zero to a non-zero velocity $v_2$, the propulsion units 130-1, 130-2, 130-3, 130-4 may be reconfigured to generate a net force $F_{NET-2}$, such as by changing a motor speed, a blade pitch angle, a gimbal angle and/or a blade shape of one or more of the propulsion units 130-1, 130-2, 130-3, 130-4.

Figure 1F:
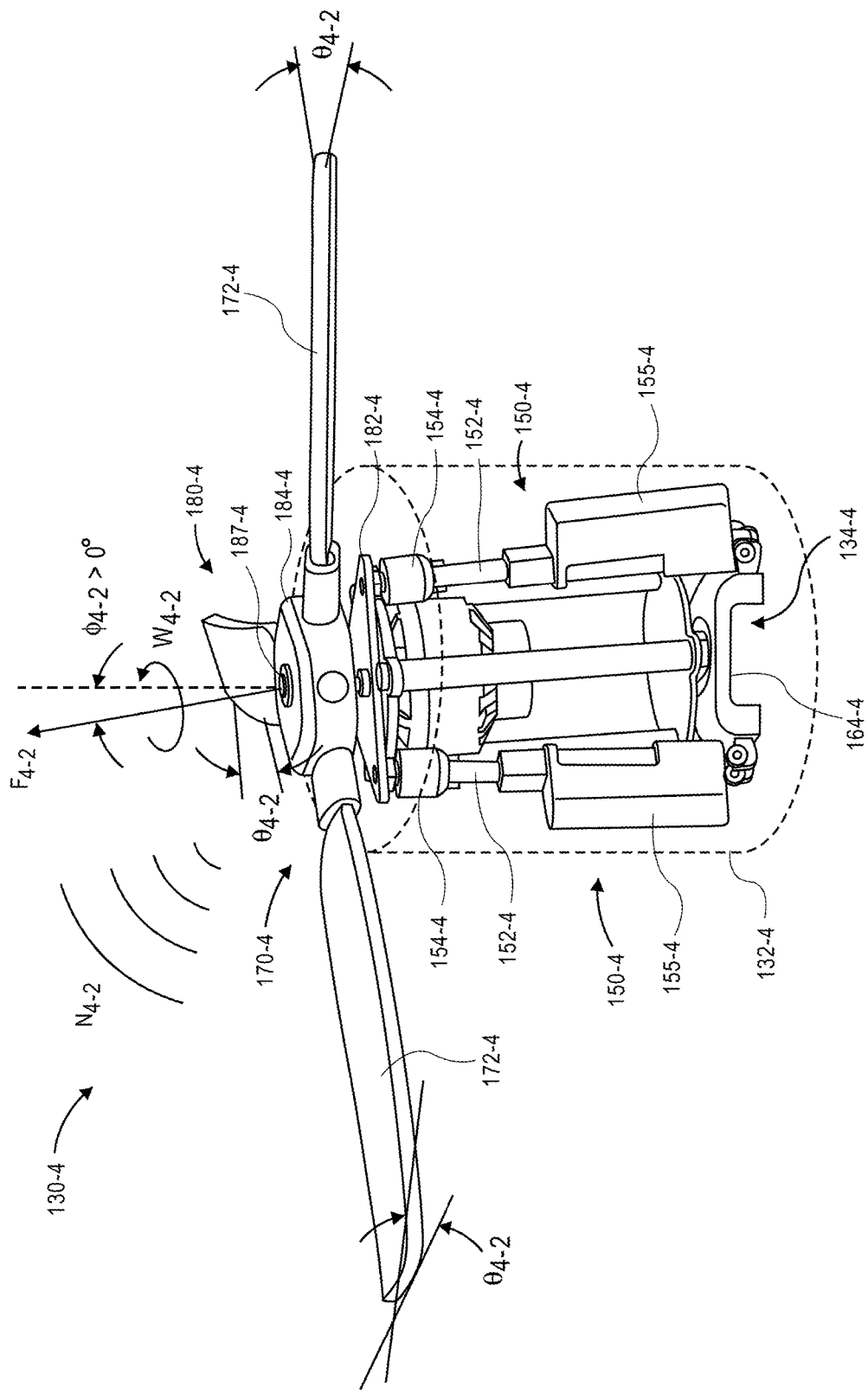

Referring to FIG. 1F, the propulsion unit 130-4 is shown as generating force having a vector $F_{4-2}$, and radiating sounds $N_{4-2}$ in one or more frequency spectrums, based on an angular velocity $\omega_{4-2}$ of the motor assembly 160-4 and the propeller 170-4, a gimbal angle $\phi_{4-2}$ of the propulsion unit 130-4 and a blade pitch angle $\theta_{4-2}$ of the blades 172-4 of the propeller 170-4. The force vector $F_{4-2}$ may be achieved by the operation of the linear actuators 155-4 and/or one or more elements of the propulsion unit 130-4, e.g., to change the speed of the motor assembly 160-4, the blade pitch angles $\theta_{4-2}$ of the blades 172-4 of the propeller 170-4, the gimbal angle $\phi_{4-2}$ of the propulsion unit 130-4 and/or a shape of one or more of the blades 174-2. For example, as is shown in FIG. 1F, and as compared to the configuration of the propulsion unit 130-4 shown in FIG. 1B or FIG. 1C, two of the linear actuators 155-4 have been extended in order to elevate at least a first portion of the plate element 182-4, and one of the linear actuators 155-4 has been retracted in order to lower at least a second portion of the plate element 182-4. The operation of the linear actuators 155-4 thus causes the gimbal angle $\phi_{4E}$ of the propulsion unit 130-4, defined on an angle of the shaft 168-4, to change. Therefore, forces generated by the propeller 170-4 during operation are supplied along an axis corresponding to the gimbal angle $\phi_{4-2}$, and regions to which noises radiated from the propulsion unit 130-4 are directed during operation may vary accordingly. Likewise, the operation of the linear actuators 155-4 also places each of the blades 172-4 of the propeller 170-4 at a blade pitch angle $\theta_{4-2}$, e.g., by changing the relative position of the variable pitch hub 180-4 with respect to the plate element 182-4.

Alternatively, those of ordinary skill in the pertinent art will recognize that a force having a vector (e.g., a magnitude and direction) may be maintained at a constant level even after one or more of a motor speed, a blade pitch angle, a gimbal angle and/or shapes of propeller blades is modified. For example, because variables such as motor speeds, blade pitch angles, gimbal angles and/or blade shapes each contribute to the forces (e.g., lift and/or thrust) generated by a propeller and/or propulsion unit in operation, a change in one of the variables (e.g., an increase or decrease in motor speed) may be counteracted by a change in one or more of the other variables (e.g., a decrease or increase in one or more blade pitch angles, gimbal angles or blade shapes) in order to maintain a magnitude or a direction of force provided by the propeller or propulsion unit. Likewise, each of the variables makes an independent contribution to a level of sound or noise radiated by the propeller and/or propulsion unit during operation. Thus, by controlling the variables associated with the operation of a propeller or propulsion unit, a given force may be maintained but with different effects on sound or noise radiated in an environment in which the aerial vehicle is operating, and such variables may be selected with regard to specific goals or objectives such as maneuverability, fuel efficiency and/or battery life, or adverse weather conditions while responding to demands for the force.

Accordingly, an aerial vehicle, such as the aerial vehicle 110 of FIGS. 1A through 1F, may be equipped with one or more propulsion units having motors and propellers that may be configured to operate in one or more distinct modes, which may be selected on any basis. For example, one or more modes of operation may be selected based on a position or location of the aerial vehicle, or any operational characteristics or environmental conditions that may be encountered by the aerial vehicle during flight. In particular, a propulsion unit of the present disclosure may include common operators that are configured to vary both blade pitch angles and/or gimbal angles, e.g., using one or more linear actuators or other components that may extend or retract, as needed, and also one or more components for varying motor speeds and/or blade shapes. Thus, a propulsion unit may be configured to not only vary both a magnitude and direction of a given force provided thereby, but also provide that same magnitude and direction of the force in any number of configurations of blade pitch angles, gimbal angles, motor speeds and/or blade shapes, in order to shape, control or manipulate a sound pressure level and/or frequency spectrums of sounds that are generated by the propulsion unit individually, or the aerial vehicle as a whole, during operation.

Figure 2:
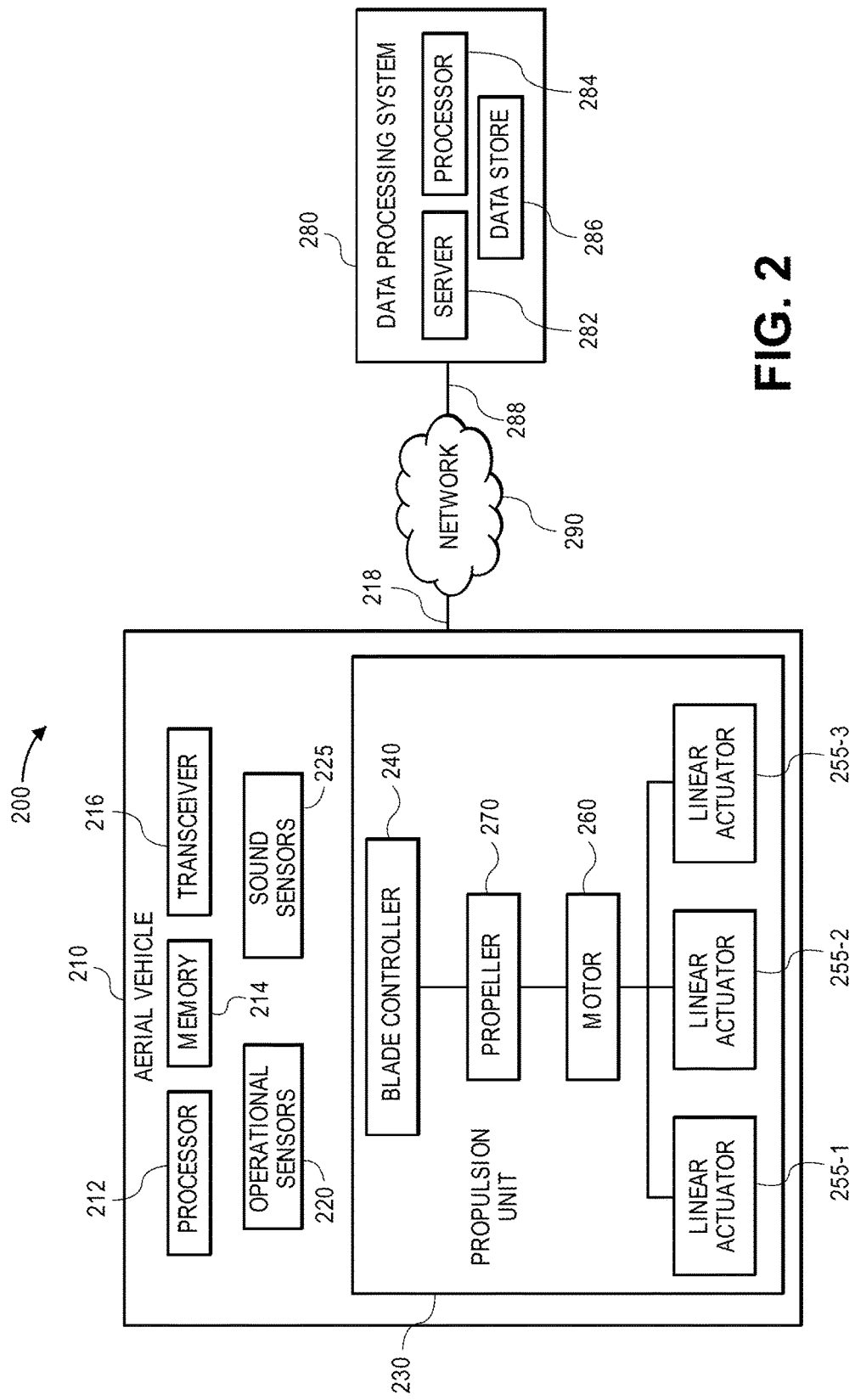
FIG. 2 is a block diagram of aspects of one system for operating an aerial vehicle having one or more embodiments of propulsion units in accordance with the present disclosure.

Referring to FIG. 2, a block diagram of components of one system 200 for operating an aerial vehicle having one or more embodiments of propulsion units in accordance with embodiments of the present disclosure is shown. The system 200 of FIG. 2 includes an aerial vehicle 210 and a data processing system 280 connected to one another over a network 290.

The aerial vehicle 210 includes a processor 212, a memory 214 and a transceiver 216. The aerial vehicle 210 further includes a plurality of environmental or operational sensors 220, a plurality of sound sensors 225. The aerial vehicle 210 also includes a propulsion unit 230 having one or more blade controllers 240, one or more linear actuators 255-1, 255-2, 255-3, a motor 260 and a propeller 270 that is physically coupled to the motor 260 and in communication with the one or more blade controllers 240.

The processor 212 may be configured to perform any type or form of computing function associated with any operation of the aerial vehicle 210, including but not limited to the execution of one or more machine learning algorithms or techniques, e.g., for predicting one or more attributes of the aerial vehicle 210 based on historical data regarding prior operations of the aerial vehicle 210, or one or more other aerial vehicles, or for processing acoustic data captured during the operation of the aerial vehicle 210, e.g., by the sound sensors 225. The processor 212 may control any aspects of the operation of the aerial vehicle 210 and the one or more computer-based components thereon, including but not limited to the transceiver 216, the environmental or operational sensors 220 or the sound sensors 225. The aerial vehicle 210 may likewise include one or more control systems (not shown) that may generate instructions for operating any number of components of the aerial vehicle 210, e.g., the blade controllers 240, the linear actuators 255-1, 255-2, 255-3, the motor 260 and/or the propeller 270, as well as any rudders, ailerons, flaps or other control surfaces (not shown) provided thereon. Such control systems may be associated with one or more other computing devices or machines, and may communicate with the data processing system 280 or one or more other computer devices (not shown) over the network 290, as indicated by line 218, through the sending and receiving of digital data. For example, the processor 212 may be operate or be associated with one or more electronic speed controls, feedback circuits or other components for controlling the operation of the blade controllers 240, the linear actuators 255-1, 255-2, 255-3, the motor 260 and/or the propeller 270, or any control surfaces provided thereon.

The aerial vehicle 210 further includes one or more memory or storage components 214 for storing any type of information or data, e.g., instructions for operating the aerial vehicle 210, the propulsion unit 230, the blade controllers 240, the linear actuators 255-1, 255-2, 255-3, the motor 260 or the propeller 270, as well as information or data captured by one or more of the environmental or operational sensors 220 or the sound sensors 225.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 290 or directly.

The operational sensors 220 may include any components or features for determining one or more attributes of an environment in which the aerial vehicle 210 is operating or may be expected to operate, or one or more operational characteristics of the aerial vehicle 210, including extrinsic information or data or intrinsic information or data. For example, the operational sensors 220 may include, but are not limited to, any types of receivers or sensors. For example, one such sensor may be a Global Positioning System ("GPS") sensor, or any device, component, system or instrument adapted to receive signals (e.g., trilateration data or information) relating to a position of the aerial vehicle 210 from one or more GPS satellites of a GPS network (not shown). Another such sensor may be a compass, or any device, component, system, or instrument adapted to determine one or more directions with respect to a frame of reference that is fixed with respect to the surface of the Earth (e.g., a pole thereof). The operational sensors 220 may further include a speedometer or any device, component, system, or instrument for determining a speed or velocity of the aerial vehicle 210, and may include related components (not shown) such as pitot tubes, accelerometers, or other features for determining speeds, velocities, or accelerations.

Likewise, the operational sensors 220 may include any device, component, system, or instrument for determining an altitude of the aerial vehicle 210, and may include any number of barometers, transmitters, receivers, range finders (e.g., laser or radar) or other features. The operational sensors 220 may further include thermometers, barometers or hygrometers, or any devices, components, systems, or instruments for determining local air temperatures, atmospheric pressures, or humidities, respectively, within a vicinity of the aerial vehicle 210. The operational sensors 220 also include one or more gyroscopes, or any mechanical or electrical device, component, system, or instrument for determining an orientation, e.g., the orientation of the propulsion unit 230 or the aerial vehicle 210, or of one or more components thereof. In some embodiments, the operational sensors 220 may include a traditional mechanical gyroscope having at least a pair of gimbals and a flywheel or rotor, or an electrical gyroscope such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 210 or one or more components thereof.

Those of ordinary skill in the pertinent arts will recognize that the operational sensors 220 may further include any type or form of device or component for determining an environmental condition within a vicinity of the aerial vehicle 210, or an operational characteristic of the aerial vehicle 210, in accordance with the present disclosure. For example, the operational sensors 220 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers, tachometers or the like, as well as one or more imaging devices (e.g., digital cameras).

The sound sensors 225 may include other components or features for detecting and capturing sound energy in a vicinity of an environment in which the aerial vehicle 210 is operating, or may be expected to operate, including but not limited to one or more microphones, piezoelectric sensors or vibration sensors. For example, such microphones may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. Such microphones also be provided as a discrete component, or in combination with one or more other components, e.g., an imaging device such as a digital camera. Furthermore, such microphones may be configured to detect and record acoustic energy from any and all directions.

Likewise, such piezoelectric sensors may be configured to convert changes in pressure, including but not limited to such pressure changes that are initiated by the presence of acoustic energy across various bands of frequencies, to electrical signals, and may include one or more crystals, electrodes or other features. Such vibration sensors may be any device configured to detect vibrations of one or more components of the aerial vehicle 210, and may also be a piezoelectric device. For example, a vibration sensor may include one or more accelerometers, e.g., an application-specific integrated circuit and one or more microelectromechanical sensors in a land grid array package, that are configured to sense differential accelerations along one or more axes over predetermined periods of time and to associate such accelerations with levels of vibration and, therefore, sound.

As is noted above, the propulsion unit 230 includes the blade controllers 240, the linear actuators 255-1, 255-2, 255-3, the motor 260 and the propeller 270. The blade controllers 240 may include a plurality of components for operating and/or adjusting one or more attributes of blades of the propeller 270 at a predetermined time or in accordance with a predefined schedule, or in response to one or more control signals, sensed environmental conditions or sensed operational characteristics. For example, such controllers 240 may be configured to rotate blade tips of such blades, change the shapes of such blades, or modify any number of other attributes of such blades. The blade controllers 240 may thus control, initiate or operate one or more mechanical or electrical features provided on or in association with the propeller 270 for the purpose of altering one or more attributes thereof. The linear actuators 255-1, 255-2, 255-3 may be configured to extend or retract in a straight line, e.g., in response to one or more control signals or commands, thereby increasing or decreasing a distance between two components of the propulsion unit 230 to which each of the linear actuators 255-1, 255-2, 255-3 is joined, such as the gimbaling base 134-4 and the plate element 182-4 shown in FIG. 1B, 1C or 1F. For example, the linear actuators 255-1, 255-2, 255-3 may include one or more screws or other threaded elements having operators configured for rotary motion about such elements, as well as one or more hydraulic, pneumatic or electromechanical operators. Any component for causing linear motion between two points within the propulsion unit 230 may be included as one or more of the linear actuators 255-1, 255-2, 255-3 of the present disclosure.

The data processing system 280 includes one or more physical computer servers 282 having a plurality of databases 284 associated therewith, as well as one or more computer processors 286 provided for any specific or general purpose. For example, the data processing system 280 of FIG. 2 may be independently provided for the exclusive purpose of receiving, analyzing or storing information or data regarding one or more missions or evolutions that have been performed or are scheduled to be performed by the aerial vehicle 210, including but not limited to information or data regarding demands for force (e.g., lift and/or thrust) during such missions or evolutions, or sounds or noises that have been emitted or are expected to be emitted during such missions or evolutions. Alternatively, the data processing system 280 may be provided in connection with one or more physical or virtual services configured to receive, analyze or store instructions for operating the aerial vehicle 210 or other information or data, as well as to perform one or more other functions. The servers 282 may be connected to or otherwise communicate with the databases 284 and the processors 286. The databases 284 may store any type of information or data, including but not limited to information or data regarding the operation of the aerial vehicle 210, e.g., information or data captured by one or more of the operational sensors 220 or the sound sensors 225, as well as information or data regarding operation of the blade controllers 240, the linear actuators 255-1, 255-2, 255-3, the motor 260 or the propeller 270, which may be correlated or otherwise associated with the information or data captured by one or more of the operational sensors 220 or the sound sensors 225.

The servers 282 and/or the computer processors 286 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the network 290 and/or the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210 or the data processing system 280 may communicate with any of a number of computing devices that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212 or the processor 284, or any other computers or control systems utilized by the aerial vehicle 210 or the data processing system 280, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
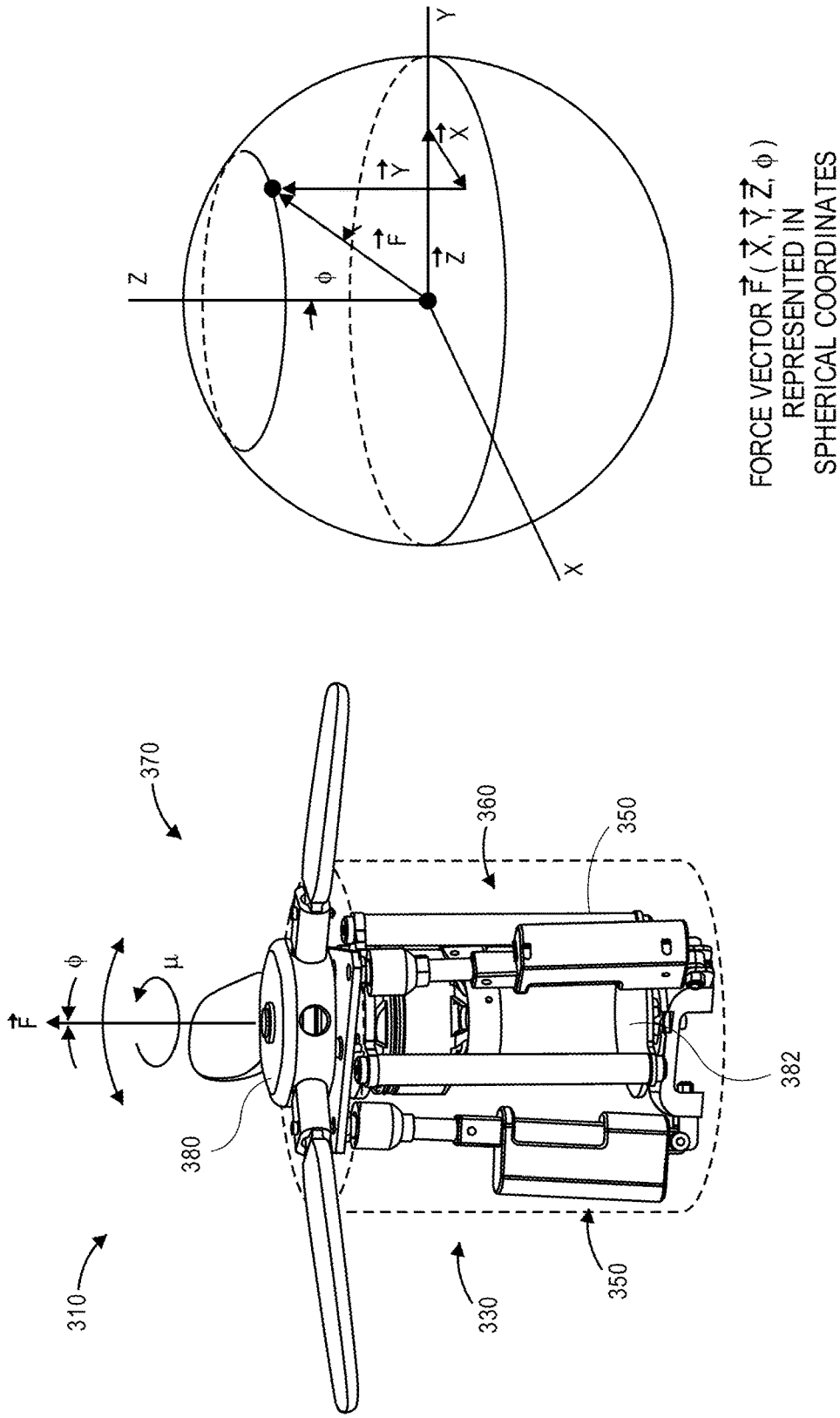
FIG. 3 is a view of aspects of an embodiment of an aerial vehicle in accordance with embodiments of the present disclosure.

One or more of the propulsion units of the present disclosure may be configured to generate a selected force based on a plurality of variables associated with the motors or propellers provided thereon. For example, as is discussed above, a vector associated with a force generated by a propulsion unit (e.g., a magnitude of the force, and a direction of the force) may be selected based at least in part on one or more of a motor speed, a gimbal angle, a blade pitch angle and/or a blade shape, each of which may be modified during or prior to operation of the propulsion unit. Referring to FIG. 3, a portion of one embodiment of an aerial vehicle 310 of the present disclosure is shown. Except where otherwise noted, reference numerals preceded by the number "3" shown in FIG. 3 indicate components or features that are similar to components or features having reference numerals preceded by the number "2" shown in FIG. 2 or by the number "1" shown in FIGS. 1A through 1F.

As is shown in FIG. 3, the portion of the aerial vehicle 310 includes a propulsion unit 330 having a plurality of adjustable plate supports 350, a motor 360 and a propeller 370. The motor 360 is provided within a housing of the propulsion unit 330, and is coupled to the propeller 370 via a drive shaft. The propeller 370 is provided external to the housing of the propulsion unit 330 in which the motor 360 is provided, and includes a plurality of blades, each of which is coupled to a variable pitch hub 380, e.g., by a rotatable linkage (not shown). The three adjustable plate supports 350 are joined to a plate element 382 at three points and may extend or retract, as needed, to vary either a planar angle of the plate element 382 and, therefore, a gimbal angle of the propulsion unit 330, or pitch angles of the blades of the propeller 370, or both the gimbal angle of the propulsion unit 330 and the pitch angles of the blades of the propeller 370.

In accordance with the present disclosure, a force F is generated by the propulsion unit 330 based on a number of factors, many of which may be automatically and/or selectively chosen and/or varied in accordance with the present disclosure. For example, a magnitude and a direction of the force F may depend on an angular velocity ω of the motor 360 and/or propeller 370, which is defined based on an operating speed of the motor 360. Additionally, the magnitude and/or the direction of the force F may also depend on a gimbal angle φ of the propulsion unit 330, which is defined based at least in part on an angular orientation of an axis of the shaft 365 about which the propeller 370 rotates, and which may itself be defined based on an angular orientation of the plate element 382. The magnitude and/or the direction of the force F may further depend on pitch angles θ of the blades of the propeller 370, which may be defined based on a relative distance between the variable pitch hub 380 and the plate element 382. The magnitude and/or the direction of the force F may also depend on shapes and/or dimensions of the blades of the propeller 370, e.g., dimensions of the faces or backs of such blades, such as a length l or a width w of the blades, as well as shapes or contours of leading edges, trailing edges, or any appurtenances extending from the blades. In some embodiments, the magnitude and/or direction of the force F may depend on whether the propeller 370 is balanced or imbalanced.

Forces generated by propulsion units, such as the force F generated by the propulsion unit 330, may be represented in a vector having one or more components or aspects in three-dimensional space. As is shown in FIG. 3, the force F may be represented in spherical coordinates, with X, Y and Z components along respective axes or dimensions and with the gimbal angle $\phi$ from normal. Thus, the length of the vector corresponding to the force F is proportional to its magnitude, and the angle $\phi$ of the vector corresponding to the force is associated with its direction. The various X, Y and Z components are indicative of magnitudes of force along each of the axes or in each of the three dimensions. Where an aerial vehicle, such as the aerial vehicle 110 of FIGS. 1A through 1F, includes one or more propulsion units, the effects of the forces generated by each of the propulsion units result in a net force that is applied to the aerial vehicle. For example, a magnitude of a net force supplied to the aerial vehicle having multiple propulsion units of the present disclosure may be determined based on a sum of the forces generated by such propulsion units in each of the X, the Y or the Z directions, and a direction of the net force may be determined based the sums of such forces, and according to the Pythagorean theorem.

Therefore, because each of the forces generated by each of the propulsion units provided on an aerial vehicle in accordance with the present disclosure is determined as function of the angular velocities (or speeds) of the respective motors, the gimbal angles of the propulsion units, or the pitch angles and shapes or dimensions of the propeller blades of such propulsion units, an aerial vehicle may achieve a desired net force by controlling the motors, the gimbal angles, the pitch angles and the shapes of the blades of each of the respective propulsion units. Moreover, in some embodiments, the gimbal angles and the blade pitch angles may be specifically selected and controlled using one or more linear actuators, such as those that may be provided within or in association with the adjustable plate supports 350 of FIG. 3. In this regard, because a motor speed, a gimbal angle, a blade pitch angle and a blade shape may contribute to the sounds generated by a propulsion unit during operation in different ways, the manner in which a given force is generated by a propulsion unit may be altered to vary the sounds that are also generated by the propulsion unit during operation.

As is discussed above, blades may be joined to propeller in any manner that enables the pitch angles of such blades to be manipulated during operation by one or more common elements, such as the plate element 182-4 and the linear actuators 155-4 shown in FIG. 1B, 1C or 1F, in accordance with the present disclosure. Referring to FIGS. 4A through 4F, views of aspects of one embodiment of an aerial vehicle in accordance with embodiments of the present disclosure are shown. Except where otherwise noted, reference numerals preceded by the number "4" shown in FIGS. 4A through 4F indicate components or features that are similar to components or features having reference numerals preceded by the number "3" shown in FIG. 3, by the number "2" shown in FIG. 2 or by the number "1" shown in FIGS. 1A through 1F.

Figure 4A:
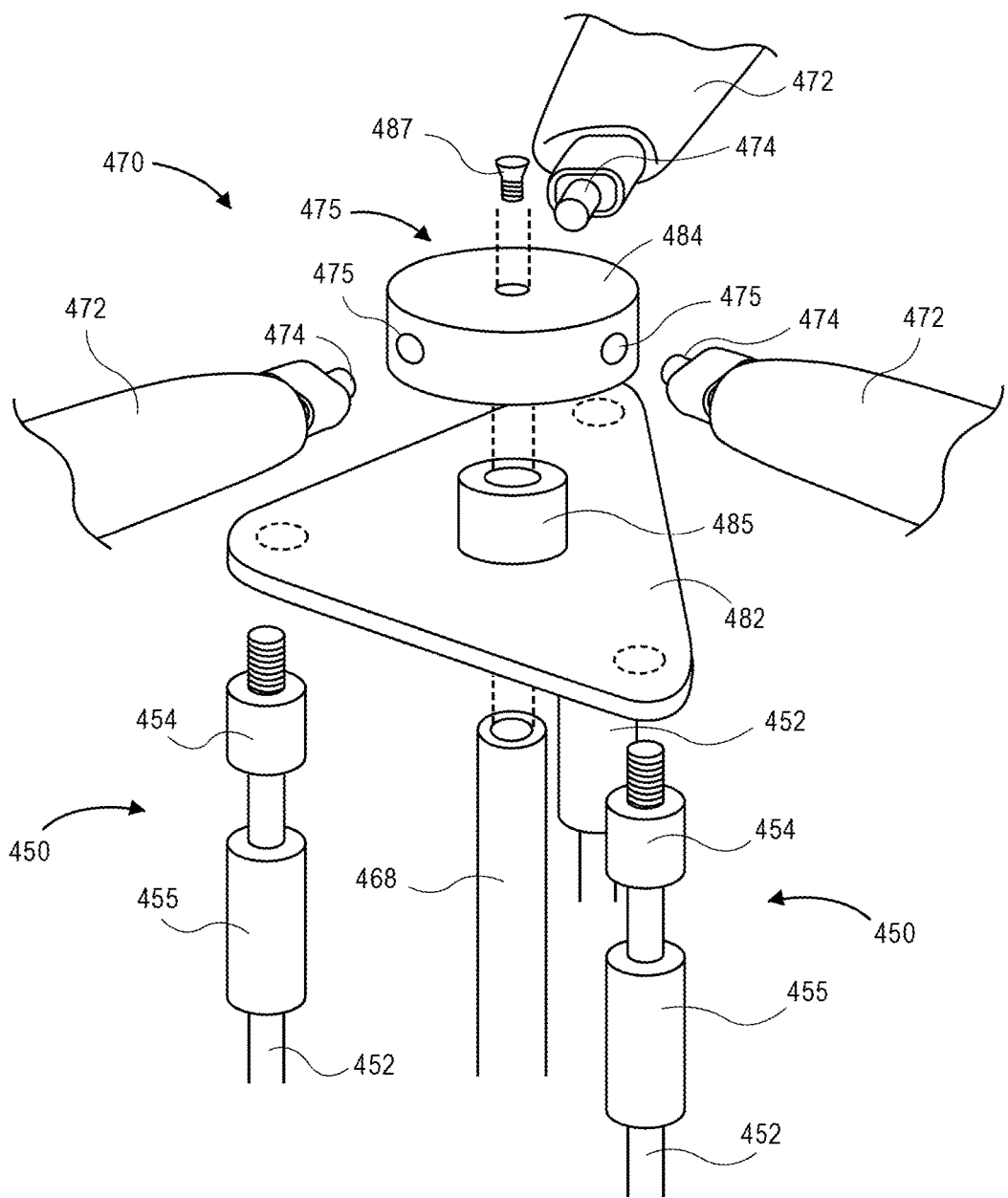
Figure 4B:
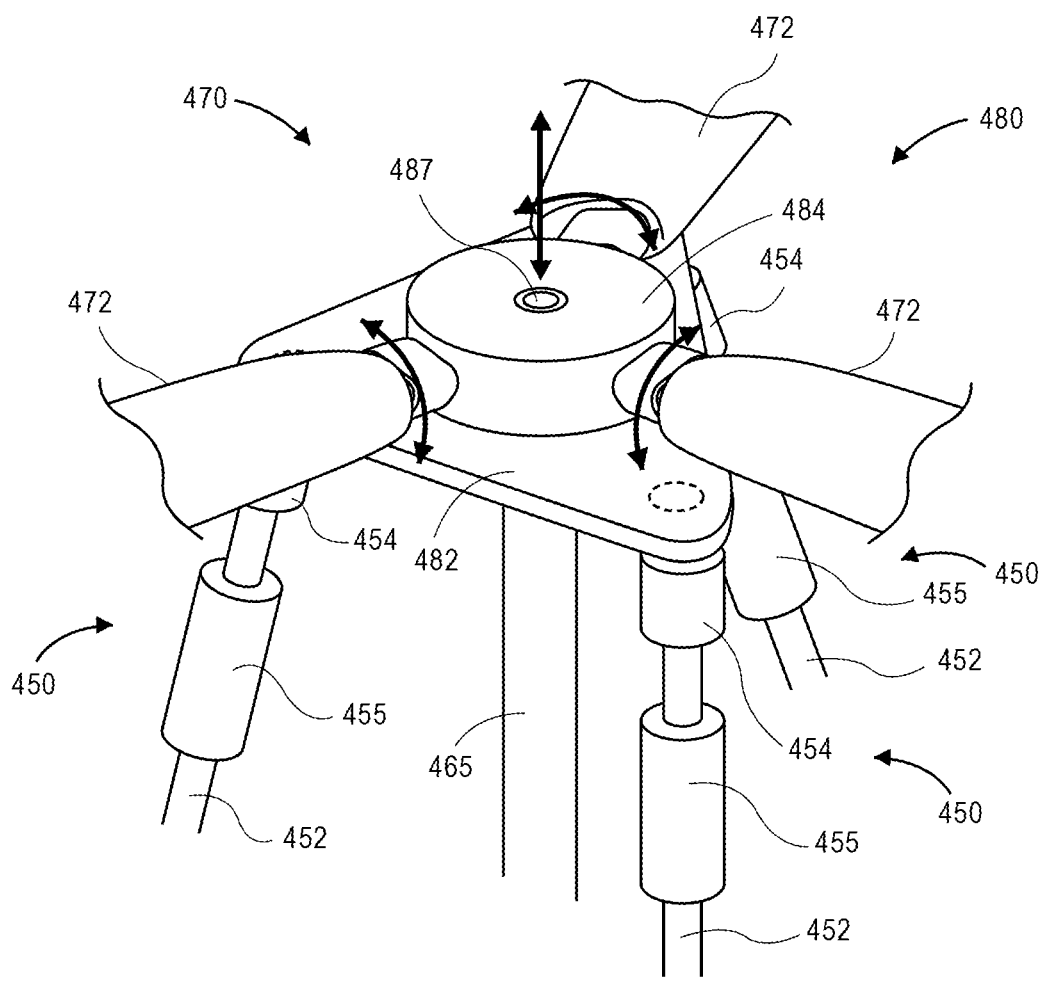
Figure 4D:
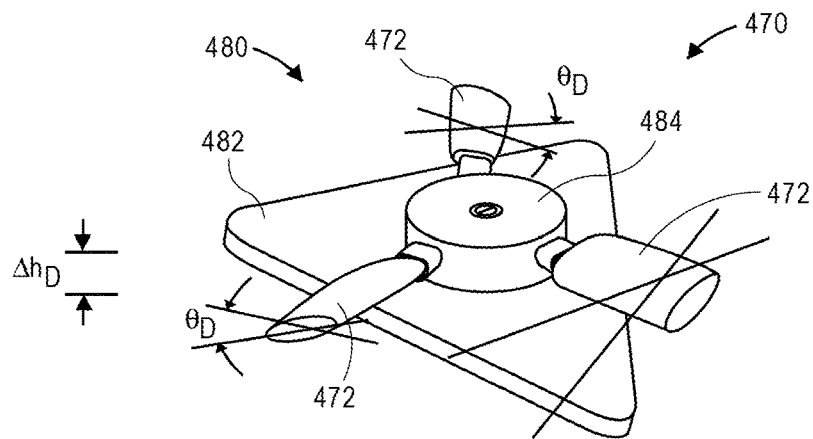

FIG. 4A shows an exploded view of portions of a plurality of plate supports 450, a propeller 470 and a variable pitch hub 480. FIG. 4B shows a view of the portions of the plate supports 450, the propeller 470 and the variable pitch hub 480 of FIG. 4A in an assembled fashion. FIG. 4C shows a sectional view of the portions of the plate supports 450, the propeller 470 and the variable pitch hub 480 of FIG. 4A in the assembled fashion. As is shown in FIGS. 4A, 4B and 4C, each of the plate supports 450 includes a shaft 452, a pivotable connector 454 (e.g., a ball-and-socket connector) and a linear actuator 455, and is joined to one corner of a triangle-shaped plate element 482 by the pivotable connector 454. Each of the plate supports 450 may also be mounted to a base or other surface within a housing (not shown). Each of the linear actuators 455 may be configured to change the lengths of the respective plate supports 450, thereby elevating or lowering a respective corner of the plate element 482, and changing an angle of a plane of the plate element 482 and/or an angle of a pitch of one or more of the blades 472 accordingly.

As is also shown in FIGS. 4A, 4B and 4C, the propeller 470 includes a plurality of blades 472 joined to a housing 484 of the variable pitch hub 480. Each of the blades 472 includes a pivotable root 474 that may be inserted into a variable pitch mechanism 475 provided within the housing 484 of the variable pitch hub 480. In some embodiments, the variable pitch mechanisms 475 are configured to pivot the blades 472 by their respective roots 474 to predetermined extents in response to relative movements between the plate element 482 and the housing 484.

As is also shown in FIGS. 4A, 4B and 4C, a shaft 468 slidably extends through a necked bore 485 in the plate element 482 and is joined to the variable pitch hub 480 by a fastener 487 (e.g., a bolt, a screw, a clip, a cotter pin, a rivet, or any other type or form of fastener by which the shaft 468 may be joined to the variable pitch hub 480). Because the necked bore 485 is substantially perpendicular to the plate element 482, the plate element 482 may move in a relative manner along the shaft 468 in order to vary a distance of the plate element 482 with respect to the housing 484 of the variable pitch hub 480, thereby causing the variable pitch mechanisms 475 to pivot the blades 472 by their respective roots 474 accordingly.

Thus, when a relative position of the plate element 482 changes with respect to the variable pitch hub 480, e.g., by extending or retracting one or more plate supports 450 coupled to the plate element 482, each of the blades 472 is caused to rotate about the axis defined by the pivotable root 474, varying a pitch angle of the blades 472 thereby. For example, as is shown in FIG. 4C, when the variable pitch hub 480 is at a first height $\Delta h_D$ with respect to the plate element 482, the blades 472 are caused to pivot about axes defined by their respective roots 474, thereby imparting a positive pitch angle $\theta_D$ to the blades 472 in an amount proportional to the first height $\Delta h_D$ of the variable pitch hub 480 with respect to the plate element 482.

Figure 4E:
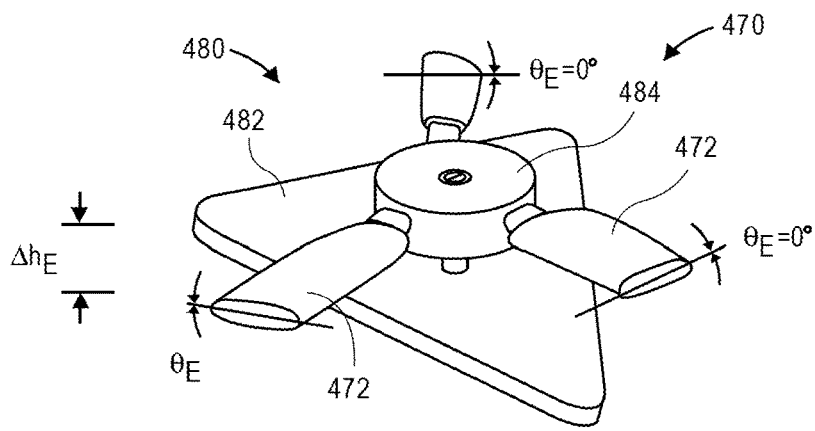
Figure 4F:
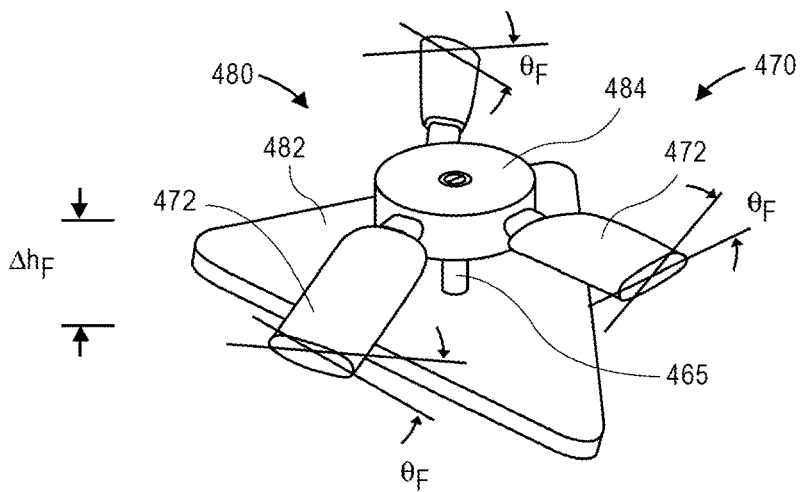

As is shown in FIG. 4E, when the variable pitch hub 480 is at a second height $\Delta h_E$ with respect to the plate element 482, the blades 472 are provided at a second pitch angle $\theta_E$, e.g., a neutral pitch angle, or where $\theta_E=0°$. As is shown in FIG. 4F, when the variable pitch hub 480 is at a third height $\Delta h_F$ with respect to the plate element 482, the blades 472 are provided at a third pitch angle $\theta_F$, e.g., a negative pitch angle $\theta_F$ is imparted to the blades 472 in an amount proportional to the third height $\Delta h_F$ of the variable pitch hub 480 with respect to the plate element 482.

As is discussed above, in accordance with the present disclosure, a pitch angle of a propeller's blades may be varied, and a gimbal angle of the propeller may be defined, using a common element that may be manipulated using one or more linear actuators or like components. In some embodiments, changing a relative position and/or orientation of such an element may vary either the pitch angle of the blades, such as is discussed above with regard to FIGS. 4D through 4F, or the gimbal angle of the propeller, or may vary both the pitch angle of the blades and the gimbal angle of the propeller.

Referring to FIGS. 5A through 5D, views of aspects of an embodiment of a propulsion unit in accordance with embodiments of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4F, by the number "3" shown in FIG. 3, by the number "2" shown in FIG. 2 or by the number "1" shown in FIGS. 1A through 1F.

Figure 5A:
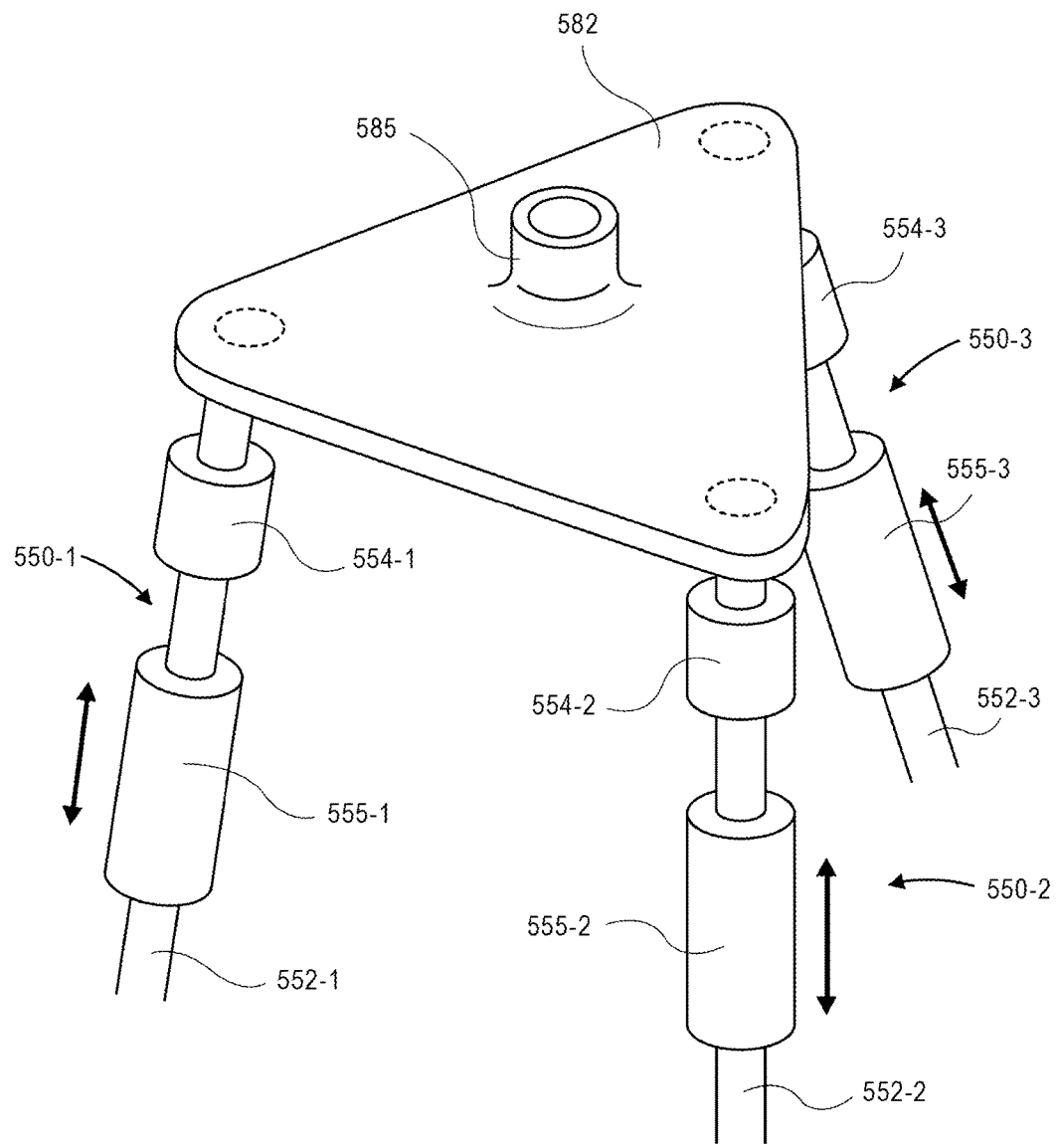
FIGS. 5A through 5D are views of aspects of an embodiment of a propulsion unit in accordance with embodiments of the present disclosure.

As is shown in FIG. 5A, a plate element 582 having a necked bore 585 extending substantially perpendicularly therethrough is coupled to a plurality of plate supports 550-1, 550-2, 550-3. Each of the plate supports 550-1, 550-2, 550-3 includes a shaft 552-1, 552-2, 552-3, a pivotable connector 554-1, 554-2, 554-3 and a linear actuator 555-1, 555-2, 555-3 that is configured to extend or retract in order to vary a position and/or orientation of the plate element 582. Where the plate element 582 is associated with rotating components of a propeller (not shown), such as the variable pitch hub 480 of FIGS. 4A through 4F, changing a relative position of the plate element 582 using the plate supports 550-1, 550-2, 550-3 may change pitch angles of blades mounted to the propeller, while changing an angle of orientation of the plate element 582 using the plate supports 550-1, 550-2, 550-3 may change a gimbal angle of the propeller. Thus, the plate supports 550-1, 550-2, 550-3 may be used to vary both a magnitude of a force generated by a propeller, and a direction of the force generated by the propeller, accordingly.

Figure 5B:
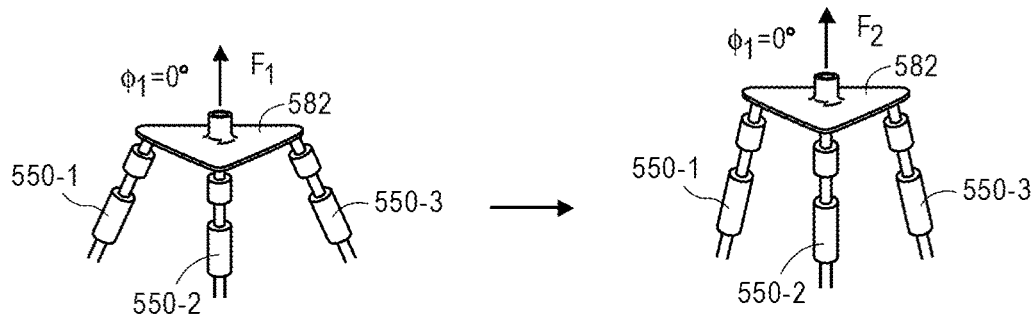
Figure 5C:
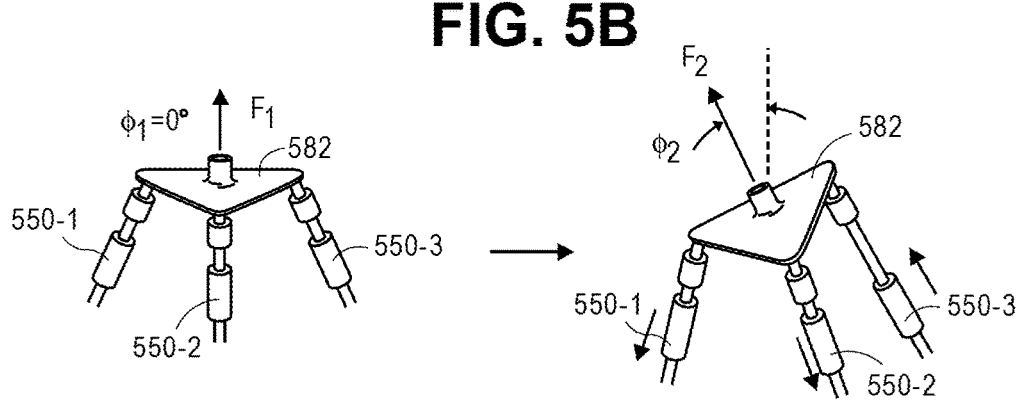
Figure 5D:
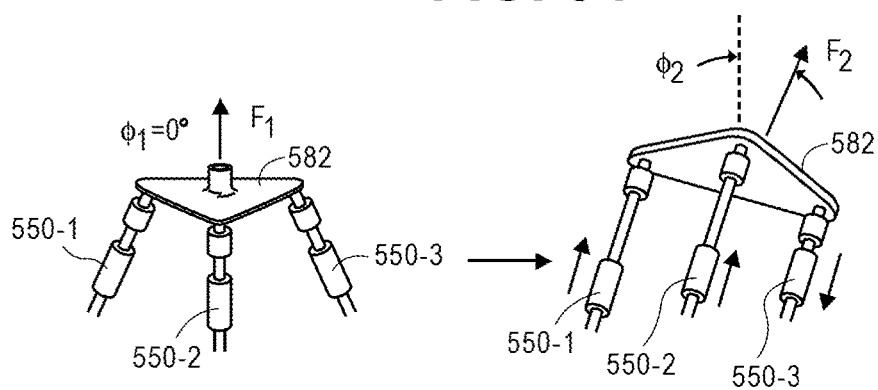

For example, as is shown in FIG. 5B, blade pitch angles may be changed by moving each of the linear actuators 555-1, 555-2, 555-3 in concert, and by equal amounts and in a common direction, thereby raising or lowering a relative position of a corresponding portion of the plate element 582 and maintaining a gimbal angle $\phi_1$ of a propeller provided thereon (not shown) at approximately zero degrees, or normal. Where a direction of the force generated by a propeller, which is defined by a gimbal angle of the propeller, is to be varied, the linear actuators 555-1, 555-2, 555-3 may be operate separately and by different amounts and/or in different directions to vary an angular orientation of the plate element 580. As is shown in FIGS. 5C and 5D, extending or retracting the linear actuators 555-1, 555-2, 555-3 to different extents imparts positive gimbal angles $\phi_2$, $\phi_3$ to a propeller provided thereon (not shown), thereby varying a direction of the forces (e.g., lift and/or thrust) generated by the propeller in a manner consistent with the variations of the gimbal angles $\phi_2$, $\phi_3$.

Accordingly, where a force in a predetermined magnitude and/or direction is demanded from a propulsion unit, a magnitude of the force may be defined by adjusting a pitch angle of the blades of a propeller, and a direction of the force may be defined by adjusting a gimbal angle of the propulsion unit or propeller, using a common system such as a plate element that is coupled to a plurality of linear actuators and provided in association with a variable pitch hub. The linear actuators may be configured to adjust the pitch angle of the blades of the propeller by extending or retracting by a common extent and substantially simultaneously. The linear actuators may also be configured to adjust the gimbal angle of the propulsion unit or propeller by extending or retracting to different extents or at different times. In some embodiments, three linear actuators may be coupled to a plate element or like feature associated with a motor and/or a propeller, consistent with the geometric lemma that any plane may be defined by three points in space. A plane of the plate element may therefore be selected by adjusting the positions of the three points at which the linear actuators are joined to the plate element. In other embodiments, more than three linear actuators may be provided to adjust an angle of a plate element. In still other embodiments, fewer than three linear actuators may be provided. Moreover, those of ordinary skill in the pertinent arts will recognize that a plate element may be manipulated using one or more linear actuators provided about a perimeter of the plate element, such as is shown in FIGS. 5A through 5D, or elsewhere on the plate element, in accordance with the present disclosure.

As is discussed above, and as will be recognized by those of ordinary skill in the pertinent arts in view of the present disclosure, a level of force generated by a propeller may be varied in any number of other ways. For example, an angular velocity or speed of a motor coupled to the propeller may be increased or decreased, and the force generated by the rotating propeller may increase or decrease by a corresponding extent, e.g., as a function of a square of the angular velocity or speed. Likewise, in addition to blade pitch, one or more additional aspects of the blades and their physical construction may be varied accordingly.

Referring to FIGS. 6A and 6B, views of aspects of an embodiment of a propulsion unit in accordance with embodiments of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A through 5D, by the number "4" shown in FIGS. 4A through 4F, by the number "3" shown in FIG. 3, by the number "2" shown in FIG. 2 or by the number "1" shown in FIGS. 1A through 1F.

As is shown in FIGS. 6A and 6B, a propulsion unit 615 includes a propeller 670 having a pair of blade roots 672, with each of the blade roots 672 being joined to a hub 680 at a proximal end and a blade tip 674 that may be retracted or otherwise varied with respect to the blade roots 672 at a distal end. The propulsion unit 615 may further include a number of additional components within a housing thereof, including one or more motors, drive shafts, bearings, linear actuators, controllers or other components for causing the propeller 670 to rotate at a desired angular velocity, for aligning the propeller 670 at a desired gimbal angle and/or for changing a pitch angle of one or more of the blades 672, including but not limited to one or more of the components shown in FIGS. 3, 4A through 4F or 5A through 5D, or like components.

The blade tips 674 may be configured to rotate about a tangential axis defined by a hinged connection with respect to a radial axis defined by the blade root 672. As is further shown in FIG. 6A, each of the blade tips 674 is aligned along radial axes defined by a respective one of the blade roots 672. Each of the blade tips 674 and each of the blade roots 672 defines an airfoil shape for generating lift when the propeller 670 is rotated about an axis defined by the hub 680, and may, in some embodiments, include rounded leading edges and pointed trailing edges that may include upper surfaces or lower surfaces having symmetrical or asymmetrical shapes or cross-sectional areas. The airfoil shapes defined by the blade roots 672 and the blade roots 674, and the pitch angles at which the blade roots 672 are mounted to the hub 680, may be selected based on an amount of lift and/or thrust desired to be provided by the propeller 670.

Moreover, the propeller 670 may be configured to rotate the blade tips 674 with respect to axes defined by the blade roots 672, either statically or dynamically during operation. As is shown in FIG. 6A, the blade tips 674 are rotated vertically upwardly with respect to the blade roots 672 by adjustable cant angles that may be limited only by constraints resulting from the construction of the propeller 670.

For example, the blade tips 674 may be rotated with respect to the blade roots 672, at any time or in accordance with a predetermined schedule (e.g., based at least in part on a transit plan involving travel from an origin to a destination, and optionally through one or more intervening waypoints), or in response to a sensed operating characteristic (e.g., dynamic attributes such as altitudes, courses, speeds, rates of climb or descent, turn rates, accelerations, tracked positions, fuel level, battery level or radiated noise; or physical attributes such as dimensions of structures or frames, numbers of propellers or motors, operating speeds of such motors) or environmental condition (e.g., temperatures, pressures, humidities, wind speeds, wind directions, times of day or days of a week, month or year when an aerial vehicle is operating, measures of cloud coverage, sunshine, or surface conditions or textures).

Additionally, the blade tips 674 may be rotated with respect to the blade roots 672 in any manner or by any means with respect to orientations or configurations defined by the blade roots 672, and to any extent. For example, one or more of the blade roots 672 may include one or more mechanical operators within airfoils of the blade roots 672 that are configured to cause the blade tips 674 to be positioned at a selected cant angle with respect to the blade roots 672. For example, in some embodiments, the propeller 670 may include a gear and cam assembly that rotates based on the rotation of a drive shaft (not shown), and causes a follower or push rod to cause the blade tip 674 to be rotated about a hinged connection to a different cant angle accordingly. In some other embodiments, the propeller 670 may include a cable-driven tension assembly that causes a cable connected to one or more of the blade tips 674 to extend or retract against centrifugal forces acting on the blade tips 674, as necessary, in order to cause the blade tip 674 to rotate about a hinge to a different cant angle accordingly. Those of ordinary skill in the pertinent arts will recognize that the propellers of the present disclosure, including but not limited to the propeller 670 of FIGS. 6A and 6B, may include any other mechanical and/or electrical systems or operators (e.g., within the airfoils of the blade roots 672 or blade tips 674) for changing cant angles with respect to the blade roots 672, or for otherwise geometrically reconfiguring a propeller in accordance with the present disclosure. Such systems or operators may be automatically controlled using one or more blade controllers that may be controlled by one or more computer processors residing aboard the aerial vehicle, or in a remote station or location, e.g., in a "cloud"-based environment.

Additionally, in some embodiments, the blade tips 674 may alternatively be provided with one or more biasing elements for urging the blade tips 674 into a predetermined cant angle with respect to a corresponding one of the blade roots 672. The blade tips 674 and/or the blade roots 674 may be solid or substantially solid, and formed from one or more homogenous or heterogeneous materials. Alternatively, the blade tips 674 and/or the blade roots 672 may be substantially hollow, e.g., each having a solid skin defining an airfoil having a hollow cavity therein, with one or more internal supports or structural features for maintaining a shape of the respective airfoils. For example, the propeller 670 or portions thereof may be formed from durable frames of stainless steel, carbon fibers or other similarly lightweight, rigid materials and reinforced with radially aligned fiber tubes or struts. Utilizing a propeller 670 having a substantially hollow cross-section thereby reduces the mass of the propeller 670, and enables wiring, cables and mechanical or electrical operators, e.g., one or more components for varying a cant angle of a blade tip 674 with respect to a blade root 672, and in communication with one or more other control systems components or features. Some other mechanical or electrical operators that may be utilized in accordance with the present disclosure include, but are not limited to, gear boxes, worm gears, servo-controlled arms. For example, mechanical or electrical equipment that is similar to equipment ordinarily utilized to change angles of control surfaces such as flaps, rudders or ailerons may be incorporated into the blade tips 674 and utilized to change the cant with respect to the blade root 672. The propeller 670 or such portions thereof may further be filled with foam or other fillers, strengthened with walls or other supports, and covered with flexible skins for resisting moisture, erosion or any other adverse effects of the elements.

Figure 7B:
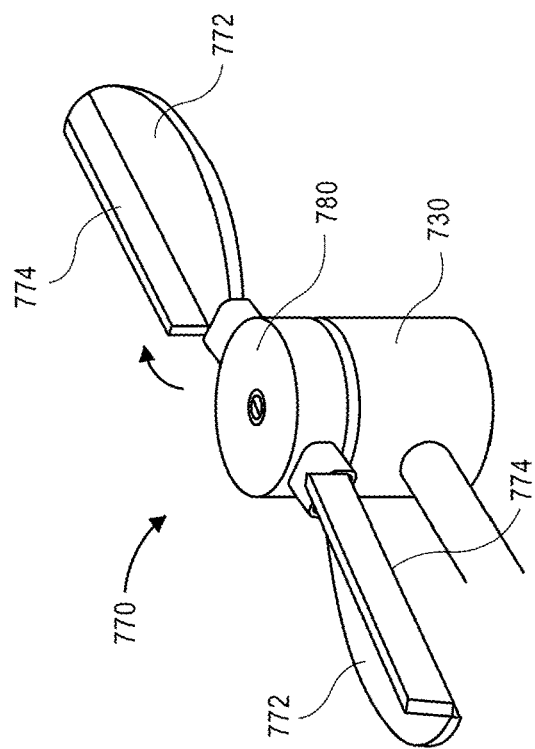
FIGS. 7A and 7B are views of aspects of an embodiment of a propulsion unit in accordance with embodiments of the present disclosure.
Figure 7A:
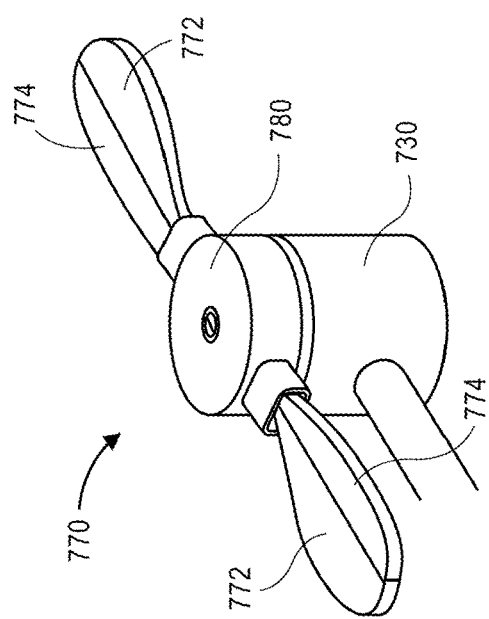

In addition to varying cant angles of blade tips with respect to blade roots, those of ordinary skill in the pertinent arts will recognize that a blade shape or geometry may be varied in any number of other ways. Referring to FIGS. 7A and 7B, views of aspects of an embodiment of a propulsion unit in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A and 6B, by the number "5" shown in FIGS. 5A through 5D, by the number "4" shown in FIGS. 4A through 4F, by the number "3" shown in FIG. 3, by the number "2" shown in FIG. 2 or by the number "1" shown in FIGS. 1A through 1F.

As is shown in FIGS. 7A and 7B, a propeller 770 includes a pair of propeller blades 772 mounted about a hub 780. Each of the blades 772 includes an adjustable blade trailing edge 774 mounted at angles that may be modified during operation. For example, as is shown in FIG. 7A, a blade trailing edge 774 may be substantially coaligned with a blade 772, e.g., within a common plane of the blade 772. As is shown in FIG. 7B, however, the blade trailing edges 774 may be rotated about a hinged connection and aligned at approximately ninety degree (90°) angles with respect to the blades 772 by one or more mechanical or electrical operators (not shown).

Referring to FIGS. 8A and 8B, views of aspects of an embodiment of a propulsion unit in accordance with embodiments of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A and 7B, by the number "6" shown in FIGS. 6A and 6B, by the number "5" shown in FIGS. 5A through 5D, by the number "4" shown in FIGS. 4A through 4F, by the number "3" shown in FIG. 3, by the number "2" shown in FIG. 2 or by the number "1" shown in FIGS. 1A through 1F.

As is shown in FIGS. 8A and 8B, a propeller 870 includes three reconfigurable propeller blades 872 mounted about a hub 880. Each of the blades 872 includes an adjustable blade camber 874 provided at a width that may be modified during operation. For example, as is shown in FIG. 8A, the cambers 874 are shown as fully extended to a maximum width of the blades 872. As is shown in FIG. 8B, however, the cambers 874 are fully retracted within the blades 872 to a minimum width.

Those of ordinary skill in the pertinent arts will recognize that blade shapes and/or geometries may be varied in any manner in accordance with the present disclosure, including but not limited to varying cant angles of blade tips, trailing edge angles and/or blade widths or other dimensions, such as is shown in FIG. 6A, 6B, 7A, 7B, 8A or 8B, or in any other manner, and that the propulsion units of the present disclosure are not limited to the embodiments of the propellers 670, 770, 870 shown in FIG. 6A, 6B, 7A, 7B, 8A or 8B.

As is discussed above, the various aspects of the propulsion units of the present disclosure may be independently operated in any number of ways in order to generate a specific force therefrom (e.g., lift and/or thrust), or to control a sound emitted thereby during operation (e.g., a sound pressure level and/or frequency spectrum). For example, where a specific position, velocity and/or acceleration is desired or required during operation of an aerial vehicle having a plurality of propulsion units of the present disclosure, each of the motor speeds, gimbal angles, blade pitch angles and/or blade shapes may be selectively adjusted in order to generate a net force in order to reach the desired or required position or achieve the desired or required velocity or acceleration. Moreover, by selectively adjusting the motor speeds, gimbal angles, blade pitch angles and/or blade shapes, a net force for reaching the desired or required position, or for achieving the desired or required velocity or acceleration, may be generated while emitting sounds in any number of different profiles or signatures.

Referring to FIGS. 9A through 9D, views of aspects of an aerial vehicle having one or more embodiments of propulsion units in accordance with embodiments of the present disclosure are shown. Except where otherwise noted, reference numerals preceded by the number "9" shown in FIGS. 9A through 9D indicate components or features that are similar to components or features having reference numerals preceded by the number "8" shown in FIGS. 8A and 8B, by the number "7" shown in FIGS. 7A and 7B, by the number "6" shown in FIGS. 6A and 6B, by the number "5" shown in FIGS. 5A through 5D, by the number "4" shown in FIGS. 4A through 4F, by the number "3" shown in FIG. 3, by the number "2" shown in FIG. 2 or by the number "1" shown in FIGS. 1A through 1F.

Figure 9A:
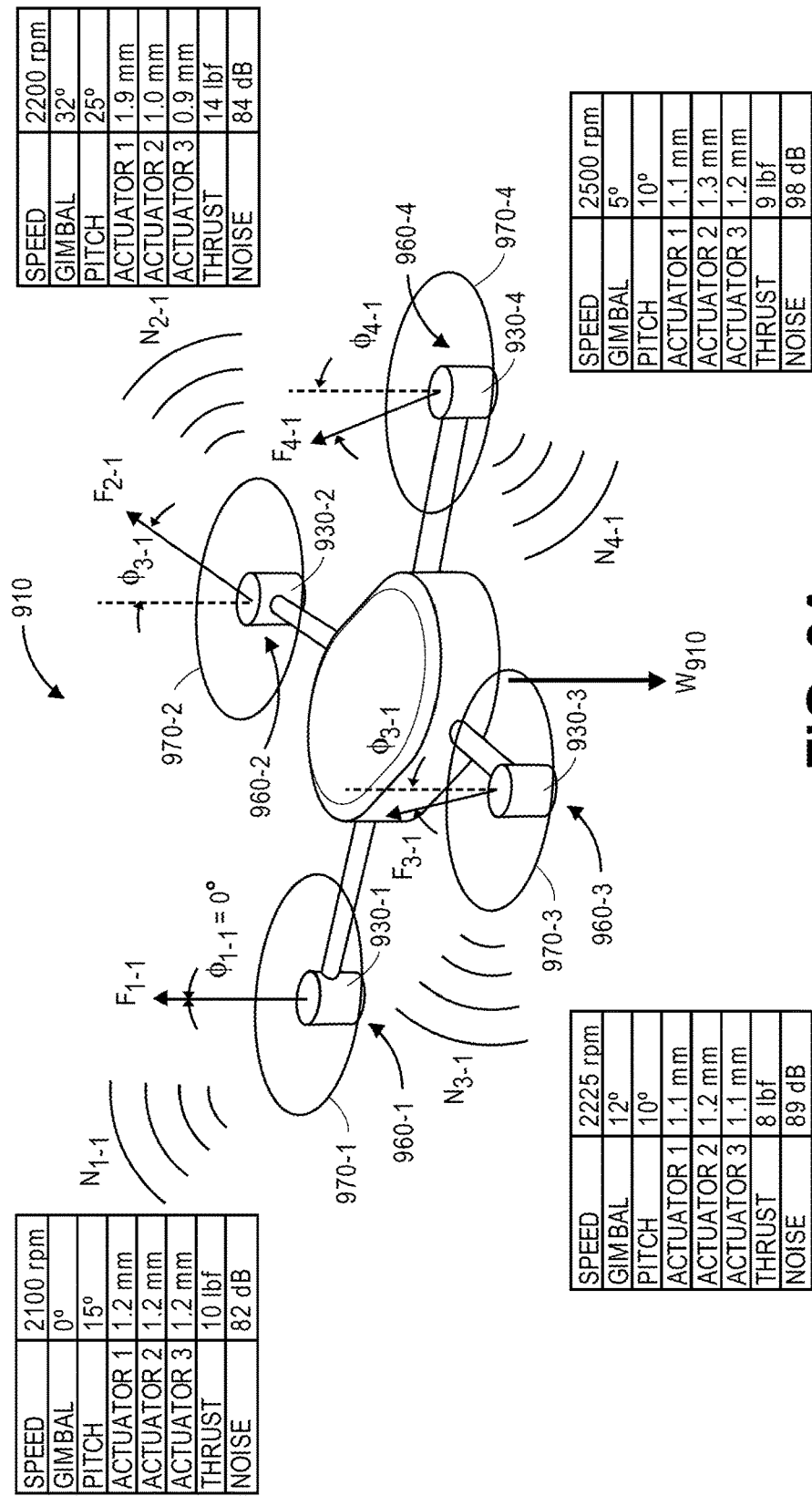
FIGS. 9A through 9D are views of aspects of an aerial vehicle having one or more embodiments of propulsion units in accordance with embodiments of the present disclosure.

As is shown in FIG. 9A, an aerial vehicle 910 includes four propulsion units 930-1, 930-2, 930-3, 930-4 in operation. Each of the propulsion units 930-1, 930-2, 930-3, 930-4 is generating a force $F_{1-1}$, $F_{2-1}$, $F_{3-1}$, $F_{4-1}$ that counteracts the weight $\omega_{910}$ of the aerial vehicle 910. Each of the propulsion units 930-1, 930-2, 930-3, 930-4 includes a motor assembly 960-1, 960-2, 960-3, 960-4 and one or more actuators and components for controlling the operation of the respective units 930-1, 930-2, 930-3, 930-4 within housings thereof, and propellers 970-1, 970-2, 970-3, 970-4 provided external to such housings. The motor assemblies 960-1, 960-2, 960-3, 960-4 and the propellers 970-1, 970-2, 970-3, 970-4 of the present disclosure may be operated in order to generate both the magnitudes and the directions of the forces $F_{1-1}$, $F_{2-1}$, $F_{3-1}$, $F_{4-1}$.

For example, as is shown in FIG. 9A, the propulsion unit 930-1 is operated with the motor assembly 960-1 at a speed of 2100 revolutions per minute (rpm), and at a gimbal angle $\phi_{1-1}$ of zero degrees (0°), viz., normal, and with blades of the propeller 970-1 at a pitch angle of fifteen degrees (15°). Each of the linear actuators (not shown) within the propulsion unit 930-1 is extended at an equal distance of 1.2 millimeters (mm), with such actuators determining both the gimbal angle and pitch angles. As a result of operating the propulsion unit 930-1 at the speeds defined by the motor assembly 960-1, and the gimbal angle and pitch angles defined by the linear actuators (not shown), a force $F_{1-1}$ having a value of ten pounds force (10 lbf) is generated in a direction of the gimbal angle $\phi_{1-1}$. Sound $N_{1-1}$ at a sound pressure level of eighty-two decibels (82 dB) is emitted from the propulsion unit 930-1.

As is also shown in FIG. 9A, the propulsion units 930-2, 930-3, 930-4 are operated with the motor assemblies 960-2, 960-3, 960-4 at speeds of 2200, 2225 and 2500 revolutions per minute (rpm), respectively, and at gimbal angles $\phi_{2-1}$, $\phi_{3-1}$, $\phi_{4-1}$, of thirty-two degrees (32°), twelve degrees (12°) and five degrees (5°), respectively, with blades of the propellers 970-2, 970-3, 970-4 at pitch angles of twenty-five degrees (25°), ten degrees (10°) and ten degrees (10°), respectively. The linear actuators of the propulsion unit 930-2 are extended at distances of 1.9, 1.0 and 0.9 millimeters (mm) each, respectively. The linear actuators of the propulsion unit 930-3 are extended at distances of 1.1, 1.2 and 1.2 millimeters (mm), respectively. The linear actuators of the propulsion unit 930-4 are extended at distances of 1.1, 1.3 and 1.2 millimeters, respectively. The distances by which the linear actuators of the propulsion units 930-2, 930-3, 930-4 are extended determine both the gimbal angles $\phi_{2-1}$, $\phi_{3-1}$, $\phi_{4-1}$ of the propulsion units 930-2, 930-3, 930-4, and the pitch angles of the blades of the propellers 970-2, 970-3, 970-4. Therefore, as a result of operating the propulsion units 930-2, 930-3, 930-4 at the speeds defined by the motor assemblies 960-2, 960-3, 960-4, and the gimbal angles $\phi_{2-1}$, $\phi_{3-1}$, $\phi_{4-1}$ and pitch angles defined by the linear actuators (not shown), forces $F_{2-1}$, $F_{3-1}$ and $F_{4-1}$ having values of fourteen pounds force (14 lbf), eight pounds force (8 lbf) and nine pounds force (9 lbf) are generated in directions of the gimbal angles $\phi_{2-1}$, $\phi_{3-1}$, $\phi_{4-1}$, respectively. Sounds $N_{2-1}$, $N_{3-1}$, $N_{4-1}$ at sound pressure levels of eighty-four decibels (84 dB), eighty-nine decibels (89 dB) and ninety-eight decibels (98 dB) are emitted from each of the propulsion units 930-2, 930-3, 930-4, respectively.

Figure 9B:
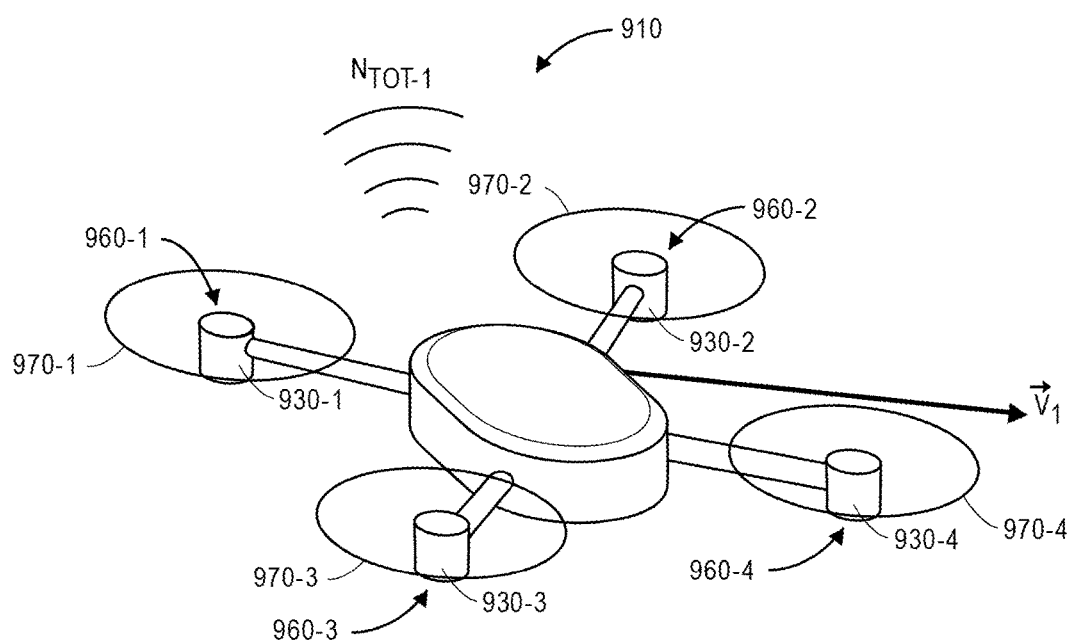

As is shown in FIG. 9B, operation of the propulsion units 930-1, 930-2, 930-3, 930-4 in the manner shown in FIG. 9A causes the aerial vehicle 910 to travel at a velocity $v_1$ in a magnitude and a direction determined based at least in part on a net effect of each of the forces $F_{1-1}$, $F_{2-1}$, $F_{3-1}$, $F_{4-1}$ on the aerial vehicle 910 and the weight $w_{910}$ of the aerial vehicle 910, as shown in FIG. 9A. The operation of the propulsion units 930-1, 930-2, 930-3, 930-4 as shown in FIG. 9B further causes the aerial vehicle 910 to radiate a net sound $N_{TOT-1}$.

As is also discussed above, where changing a position, a velocity and/or an acceleration of the aerial vehicle 910 is desired, the propulsion units 930-1, 930-2, 930-3, 930-4 may be operated independently or in concert to generate a net force on the aerial vehicle 910 that causes the aerial vehicle 910 to travel to a different position, at a different velocity, or subject to a different acceleration. As is shown in FIG. 9C, where discrete forces $F_{1-2}$, $F_{2-2}$, $F_{3-2}$, $F_{4-2}$ are desired or required from the propulsion units 930-1, 930-2, 930-3, 930-4, aspects of each of the propulsion units 930-1, 930-2, 930-3, 930-4, e.g., motor speeds, gimbal angles, blade pitch angles and/or blade shapes, may be manipulated to enable the demand for the forces $F_{1-2}$, $F_{2-2}$, $F_{3-2}$, $F_{4-2}$ from the propulsion units 930-1, 930-2, 930-3, 930-4.

Figure 9C:
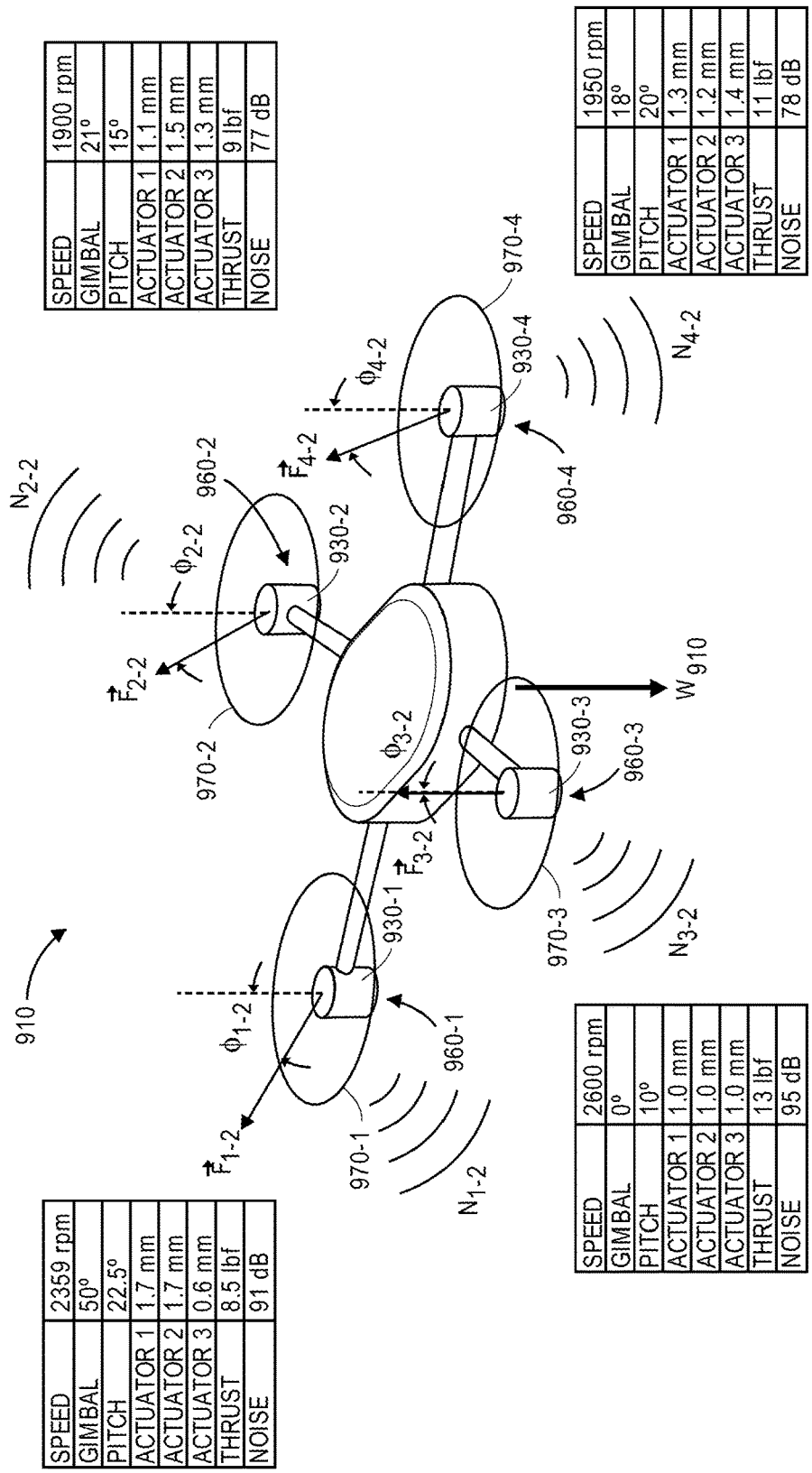

For example, referring to FIG. 9C, the propulsion unit 930-1 is operated with the motor assembly 960-1 at a speed of 2359 revolutions per minute (rpm), and at a gimbal angle $\phi_{1-1}$ of fifty degrees (50°) and with blades of the propeller 970-1 at a pitch angle of twenty-two and one half degrees (22.5°). Two of the linear actuators (not shown) within the propulsion unit 930-1 are extended at distances of 1.7 millimeters (mm), while one of the linear actuators is extended at a distance of 0.6 millimeters (mm), with such actuators determining both the gimbal angle and pitch angles. As a result of operating the propulsion unit 930-1 at the speeds defined by the motor assembly 960-1, and the gimbal angle and pitch angles defined by the linear actuators (not shown), the force $F_{1-2}$ having a value of eight-and-one-half pounds force (8.5 lbf) is generated in a direction of the gimbal angle $\phi_{1-2}$. Sound $N_{1-2}$ at a sound pressure level of ninety-one decibels (91 dB) is emitted from the propulsion unit 930-1.

As is also shown in FIG. 9C, the propulsion units 930-2, 930-3, 930-4 are operated with the motor assemblies 960-2, 960-3, 960-4 at speeds of 1900, 2600 and 1950 revolutions per minute (rpm), respectively, and at gimbal angles $\phi_{2-2}$, $\phi_{3-2}$, $\phi_{4-2}$ of twenty-one degrees (21°), eighteen degrees (18°) and zero degrees (0°), respectively, with blades of the propellers 970-2, 970-3, 970-4 at pitch angles of fifteen degrees (15°), ten degrees (10°) and twenty degrees (20°), respectively. The linear actuators of the propulsion unit 930-2 are extended at distances of 1.1, 1.5 and 1.3 millimeters (mm) each, respectively. The linear actuators of the propulsion unit 930-3 are extended at distances of 1.0, 1.0 and 1.0 millimeters (mm), respectively. The linear actuators of the propulsion unit 930-4 are extended at distances of 1.3, 1.2 and 1.4 millimeters, respectively. The distances by which the linear actuators of the propulsion units 930-2, 930-3, 930-4 are extended determine both the gimbal angles $\phi_{2-2}$, $\phi_{3-2}$, $\phi_{4-2}$ of the propulsion units 930-2, 930-3, 930-4, and the pitch angles of the blades of the propellers 970-2, 970-3, 970-4. Therefore, as a result of operating the propulsion units 930-2, 930-3, 930-4 at the speeds defined by the motor assemblies 960-2, 960-3, 960-4, and the gimbal angles $\phi_{2-2}$, $\phi_{3-2}$, $\phi_{4-2}$ and pitch angles defined by the linear actuators (not shown), the forces $F_{2-2}$, $F_{3-2}$ and $F_{4-2}$ having values of nine pounds force (9 lbf), thirteen pounds force (13 lbf) and eleven pounds force (11 lbf) are generated in directions of the gimbal angles $\phi_{2-2}$, $\phi_{3-2}$, $\phi_{4-2}$, respectively. Sounds $N_{2-2}$, $N_{3-2}$, $N_{4-2}$ at sound pressure levels of seventy-seven decibels (77 dB), ninety-five decibels (95 dB) and seventy-eight decibels (78 dB) are emitted from each of the propulsion units 930-2, 930-3, 930-4, respectively.

Figure 9D:
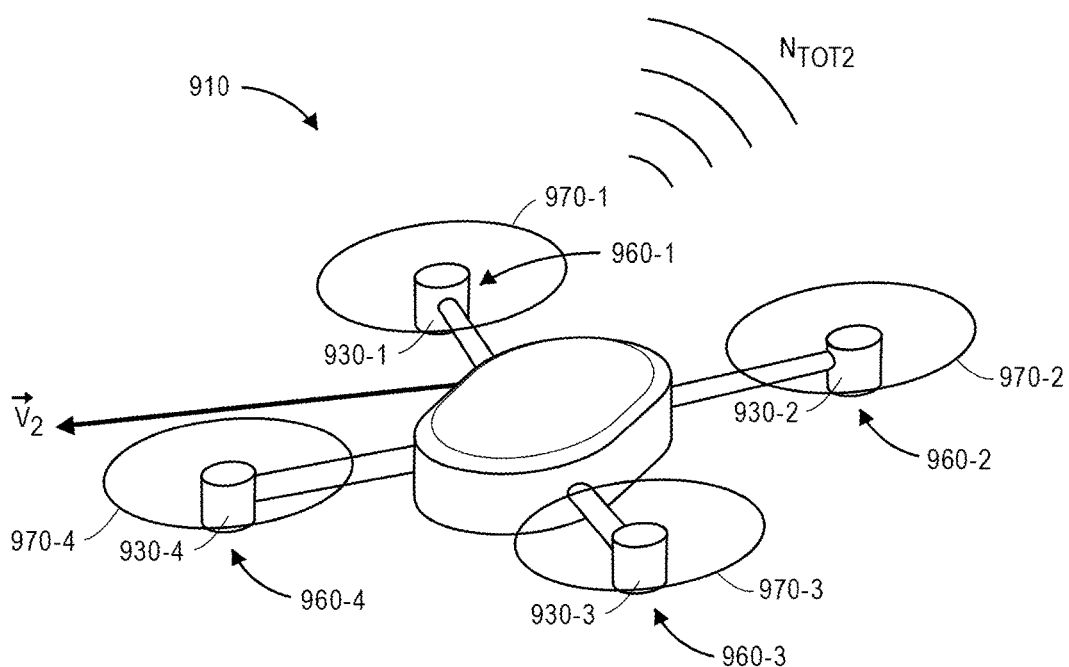

As is shown in FIG. 9D, operation of the propulsion units 930-1, 930-2, 930-3, 930-4 in the manner shown in FIG. 9C causes the aerial vehicle 910 to travel at a velocity $v_2$ in a magnitude and a direction determined based at least in part on a net effect of each of the forces $F_{1-2}$, $F_{2-2}$, $F_{3-2}$, $F_{4-2}$ on the aerial vehicle 910 and the weight $w_{910}$ of the aerial vehicle 910, as shown in FIG. 9C. The operation of the propulsion units 930-1, 930-2, 930-3, 930-4 as shown in FIG. 9C further causes the aerial vehicle 910 to radiate a net sound $N_{TOT-2}$.

Accordingly, those of ordinary skill in the pertinent arts will recognize that the use of propulsion units with independently adjustable aspects on an aerial vehicle, such as the aerial vehicle 910 of FIGS. 9A through 9D, enables the aerial vehicle to selectively define not only a magnitude or direction of force (e.g., lift and/or thrust) but also aspects of the specific sounds (e.g., sound pressure levels and/or frequency spectrums) generated thereby. For example, referring again to the aerial vehicle 910 of FIGS. 9A through 9D, aspects of each of the propulsion units 930-1, 930-2, 930-3, 930-4, e.g., motor speeds, gimbal angles, blade pitch angles and/or blade shapes, may be manipulated in order to maintain the magnitude and direction of the forces generated thereby constant, while varying the sound pressure levels and frequency spectrums emitted during operation. In some embodiments, sounds that are emitted by an aerial vehicle may be monitored, and where such sounds approach or exceed one or more thresholds, the sounds may be varied by individually adjusting one or more aspects of the propulsion units 930-1, 930-2, 930-3, 930-4.

As is discussed above, aspects of embodiments of the propulsion units of the present disclosure may be independently manipulated to generate forces thereby, and such forces may have a net effect on an aerial vehicle outfitted with such propulsion units. Thus, the individual aspects of such propulsion units may be individually selected to generate specific forces from each of such propulsion units which, when aggregated, impart a desired net force upon the aerial vehicle as a whole. In some other embodiments, such aspects may be individually selected as a part of an overall sound management strategy, e.g., to limit or confine sound pressure levels and/or frequency spectrums radiating from a propulsion unit individually, or by an aerial vehicle as a whole, during operation.

Figure 10:
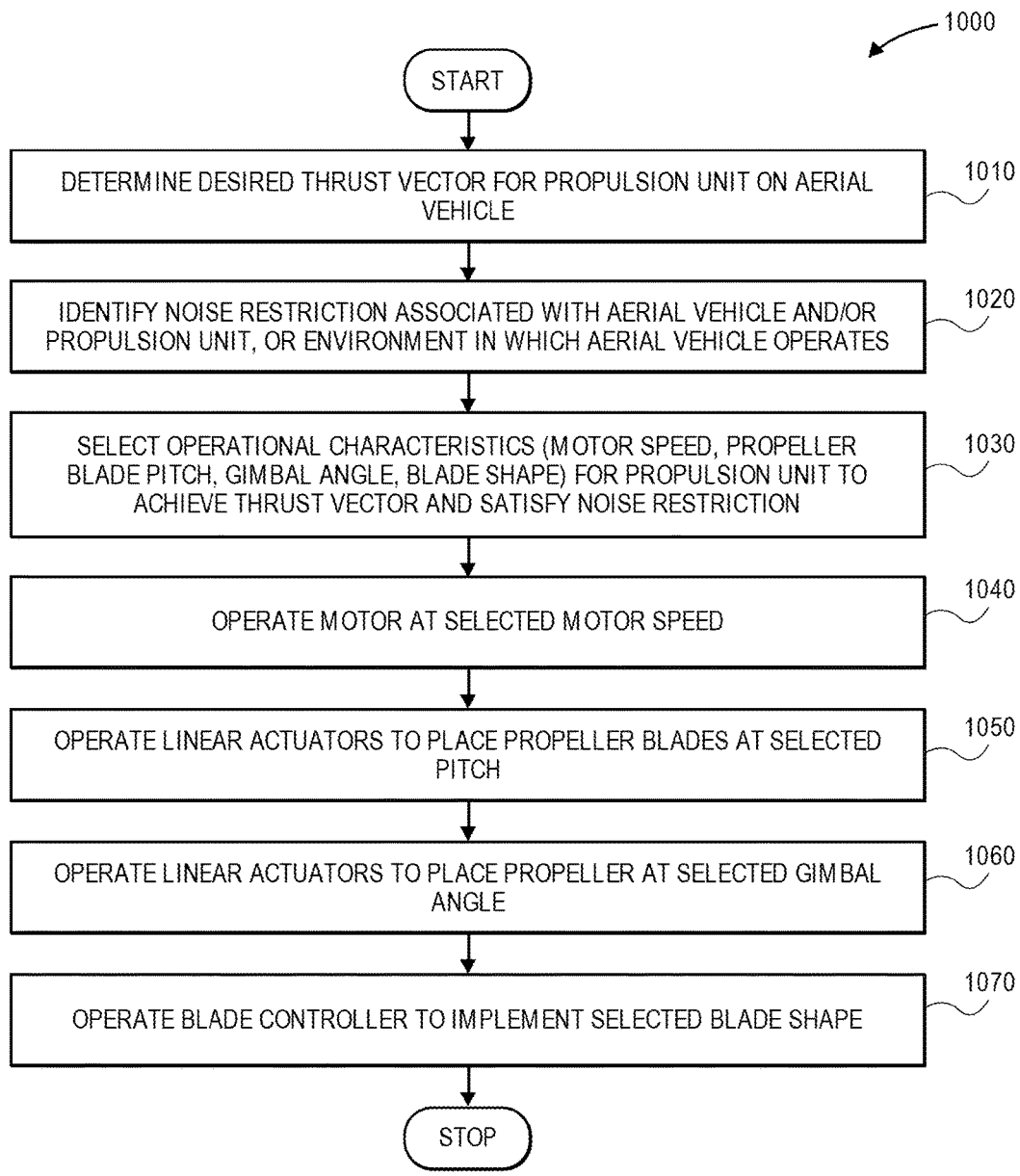
FIG. 10 is a flow chart of one process for operating an aerial vehicle having one or more embodiments of propulsion units in accordance with the present disclosure.

Referring to FIG. 10, a flow chart 1000 of one process for operating an aerial vehicle having one or more embodiments of propulsion units in accordance with the present disclosure is shown. At box 1010, a desired thrust vector for a propulsion unit on an aerial vehicle is determined. For example, the desired thrust vector may be selected in order to cause the aerial vehicle to travel to a specific point, or at a desired velocity, or subject to a specific acceleration. The desired thrust vector may also be selected based on one or more operating restrictions (e.g., speeds, altitudes, levels of sound or noise, maneuverability, fuel efficiency and/or battery life) or environmental conditions (e.g., adverse weather conditions or air or ground traffic). In some embodiments, the desired thrust vector for the propulsion unit will be selected in concert with desired thrust vectors for one or more other propulsion units provided on the aerial vehicle.

At box 1020, a noise restriction associated with the operation of the aerial vehicle and or the propulsion unit in an environment is identified. For example, the noise restriction may identify an expressly set limit on sound pressure levels (or intensities), or on frequency spectrums, that may be radiated from the aerial vehicle or the propulsion unit. Alternatively, the noise restriction may be a general restriction, e.g., based on safe hearing standards of humans or other animals within the environment, or a time-based limit, e.g., operating machinery when humans or other animals are expected to be sleeping within the environment. At box 1030, operational characteristics (e.g., a motor speed, a propeller blade pitch, a gimbal angle and/or a blade shape) that are required for the propulsion unit to achieve the thrust vector and satisfy the noise restriction are selected. For example, as is discussed above, a given force (e.g., a magnitude and a direction) may be provided by a propulsion unit in accordance with the present disclosure in any number of combinations of operational characteristics. For example, the same thrust may be provided when a propeller rotates at a first speed and with a first blade pitch angle, or at a second speed and with a second blade pitch angle. A propulsion unit may be operated in many combinations of such aspects in order to obtain the same force therefrom, and each of such combinations may cause the propulsion unit to radiate sound with different sound pressure levels, or within different frequency spectrums. Therefore, a combination of operational characteristics of the propulsion units that causes the propulsion unit to generate the desired thrust vector, and radiate sounds that satisfy the noise restriction, may be selected.

At box 1040, a motor is operated at a motor speed selected at box 1030. For example, in some embodiments, one or more signals may be provided to an electronic speed control (or ESC) for controlling the angular velocity of a motor provided in association with the propulsion unit. At box 1050, one or more linear actuators are operated in order to place blades of a propeller associated with the propulsion unit at a pitch angle selected at box 1030, and at box 1060, the one or more linear actuators are operated in order to place the propeller at a gimbal angle selected at box 1030. For example, in accordance with some embodiments of the present disclosure, such as the propulsion unit 130-4 shown in FIGS. 1B, 1C and 1F or the propulsion unit 330 shown in FIG. 3, the linear actuators may be operated separately or simultaneously, and to common or different extents, in order to change a relative position or orientation of a plate element, and to impart a desired gimbal angle upon the propeller, or a desired pitch angle upon one or more blades of the propeller. At box 1070, a blade controller is operated to implement a blade shape selected at box 1030, and the process ends. The blade controller may change the shapes or dimensions of one or more blades of a propeller provided in association with the propulsion unit, in a uniform or disparate manner, thereby causing the propeller to be balanced or imbalanced, as desired.

Accordingly, where a force is desired or required from a propulsion unit in accordance with the present disclosure, that force may be selectively generated, subject to the operational capacities of the propulsion unit, by varying one or more aspects of the propulsion unit such as motor speeds, gimbal angles, blade pitch angles or blade shapes. Moreover, if, after a desired magnitude and direction of thrust is obtained in accordance with the process shown in the flow chart 1000 of FIG. 10, a different thrust vector is desired, then one or more of the aspects of the propulsion unit may be modified accordingly in order to achieve a thrust consistent with that desired thrust vector. Furthermore, the values or levels of such aspects may be selected, subject to the operational capacities of the propulsion unit, with sounds generated by the propulsion unit in mind. For example, where the same level or direction of thrust may be obtained at two different motor speeds or with two different gimbal angles, blade pitch angles or blade shapes, a combination of motor speed, gimbal angle, blade pitch angle and/or blade shape that results in a lowest sound pressure level, or a more favorable frequency spectrum, may be selected, and a propulsion unit may be operated accordingly.

Figure 11:
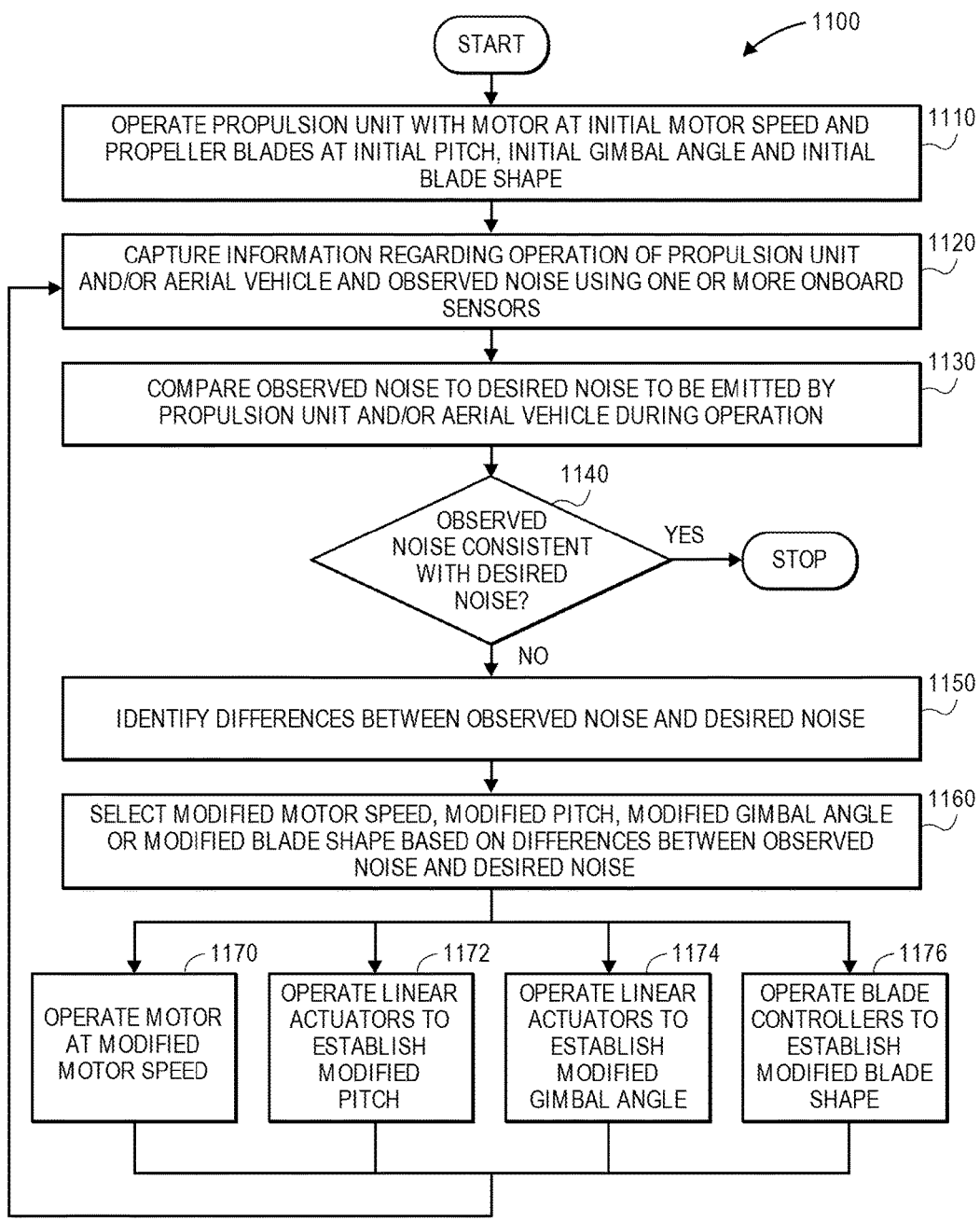
FIG. 11 is a flow chart of one process for operating an aerial vehicle having one or more embodiments of propulsion units in accordance with the present disclosure.

In accordance with the present disclosure, a propulsion unit may be selectively monitored in operation with respect to the sound radiated therefrom, and aspects of the propulsion unit may be modified, e.g., either separately or in parallel, during operation in order to change a sound pressure level, or a frequency spectrum, of the radiated sound as necessary. Referring to FIG. 11, a flow chart 1100 of one process for operating an aerial vehicle having one or more embodiments of propulsion units in accordance with the present disclosure is shown. At box 1110, a propulsion unit is operated with a motor at an initial speed, and with a propeller at an initial pitch, an initial gimbal angle and an initial shape. For example, referring again to FIG. 9A, one or more of the propulsion units 930-1, 930-2, 930-3, 930-4 may operate in accordance with one or more of the sets of aspects or operational characteristics shown thereon.

At box 1120, information regarding the operation of the propulsion unit and/or the aerial vehicle and any observed noise is captured using one or more sensors onboard the aerial vehicle. For example, such sensors may include position sensors (e.g., a GPS sensors), velocity sensors (e.g., speedometers or air speed indicators), acceleration sensors (e.g., accelerometers) or orientations sensors (e.g., gyroscopes or compasses). Such sensors may further include one or more altimeters, barometers, range finders, air monitoring sensors or imaging devices. Additionally, such sensors may also include one or more microphones, piezoelectric sensors or vibration sensors.

At box 1130, the noises observed at box 1120 are compared to a desired noise to be emitted by the propeller during operation. For example, where the aerial vehicle is expected to operate in a specific environment, a library or index of desired noises may be consulted to identify whether any specific noises are preferred or desired for that location. Alternatively, a desired noise may be defined in the negative, e.g., a noise that is below thresholds of sound pressure level or within a predefined frequency spectrum, or subject to one or more restrictions based on a time, a location, or a particular environment.

At box 1140, whether the noise observed at box 1120 is consistent with the desired noise is determined. If the observed noise is consistent with the desired noise, then the process ends. If the observed noise is not consistent with the desired noise, then the process advances to box 1150, where differences between the observed noise and the desired noise are identified. Such differences may relate to discrete narrow band tonals, or a broadband frequency spectrum, that are present or lacking within either the observed noise or the desired noise, or sound pressure levels or frequency spectrums of either the observed noise or the desired noise.

At box 1160, a modified motor speed, a modified pitch, a modified gimbal angle and/or a modified blade shape are selected based on the differences between the observed noise and the desired noise. For example, a motor speed that is expected to change the sound pressure level or the frequency spectrum of the sounds radiated from the propulsion unit during operation may be determined. Likewise, a position of one or more linear actuators in order to change a gimbal angle and/or blade pitch of the propeller may also be determined. Moreover, a specific blade shape (e.g., a cant angle of a blade tip, or a shape of the blade) may also be determined.

Once changes to one or more aspects or operational characteristics of the propulsion unit are identified, such changes may be implemented either in series or in parallel. At box 1170, the motor is operated at the modified motor speed, e.g., by sending one or more control signals to an electronic speed control of the motor, and increasing or decreasing the motor speed accordingly. At box 1172, the linear actuators are operated to establish the modified pitch angle, and at box 1172, the linear actuators are operated to establish the modified gimbal angle, e.g., by varying a relative position or angular orientation of a plate element associated with one or more aspects of the propeller, such as is discussed above with regard to FIGS. 3, 4A through 4F or 5A through 5D, or in any other manner. At box 1176, one or more blade controllers are operated to establish a modified blade shape.

After the changes to the one or more aspects or operational characteristics of the propulsion unit are identified and implemented, the process returns to box 1120, where information regarding the operation of the propulsion unit with the modified aspects or operational characteristics and/or the aerial vehicle and any observed noise is captured using one or more sensors onboard the aerial vehicle. The operation of the propulsion unit and/or the aerial vehicle may be continuously monitored until an observed noise is consistent with a desired noise, or until the aerial vehicle arrives at a destination, in accordance with the present disclosure.

In accordance with systems and methods of the present disclosure, such as the process represented in the flow chart 1100 of FIG. 11, it is not necessary to modify each of the adjustable aspects or operational characteristics of a propulsion unit in order to change a magnitude or a direction of a force generated thereby. Rather, where a desired change in a magnitude or a direction of a force generated by a propulsion unit may be effected by changing only one of a motor speed, a gimbal angle, a blade pitch angle or a blade shape, or by changing fewer than all of the motor speed, the gimbal angle, the blade pitch angle or the blade shape, then only such aspects need be changed. For example, referring again to the flow chart 1100 of FIG. 11, one or more of the actions or steps associated with boxes 1170, 1172, 1174, 1176 may be bypassed if such actions or steps are not required in order for a propulsion unit to generate a force at a desired magnitude and direction, or in order to operate the propulsion unit at a desired sound pressure level or within a desired frequency spectrum. Moreover, such processes may be performed independently or in parallel for each of the propulsion units provided on an aerial vehicle, as necessary, in order to impart a net force having a desired magnitude or direction, or to radiate sounds therefrom at a desired sound pressure level or within a desired frequency spectrum.

Those of ordinary skill in the pertinent art will further recognize that the systems and methods of the present disclosure may be utilized to plan for and track the operation of one or more propulsion units, and the sounds radiating therefrom, during operation. For example, where an aerial vehicle is configured with one or more of the propulsion units of the present disclosure, and is intended to perform a mission or evolution requiring travel from an origin to a destination, and/or through one or more intervening waypoints, various aspects or operational characteristics of such propulsion units may be selected in advance in accordance with a transit plan for the mission or evolution, such that the aspects or operational characteristics may be modified upon the aerial vehicle's arrival at one or more of the intervening waypoints or when the aerial vehicle encounters one or more environmental conditions. The aspects or operational characteristics of the propulsion units during operation may be further selected on any basis, e.g., a measure or rating of the thrust capacity, the lift capacity or the speed capacity that may be provided by the propulsion units, a measure or rating of the maneuverability of an aerial vehicle while operating the propulsion units, or a measure or rating of the one or more sounds that may be emitted by the propulsion units during operation. Such aspects or operational characteristics may also be selected based on a general level or degree of performance, or on a level or degree of performance in specific instances, e.g., with regard to specific goals or objectives such as maneuverability, fuel efficiency and/or battery life, or adverse weather conditions.

Figure 12:
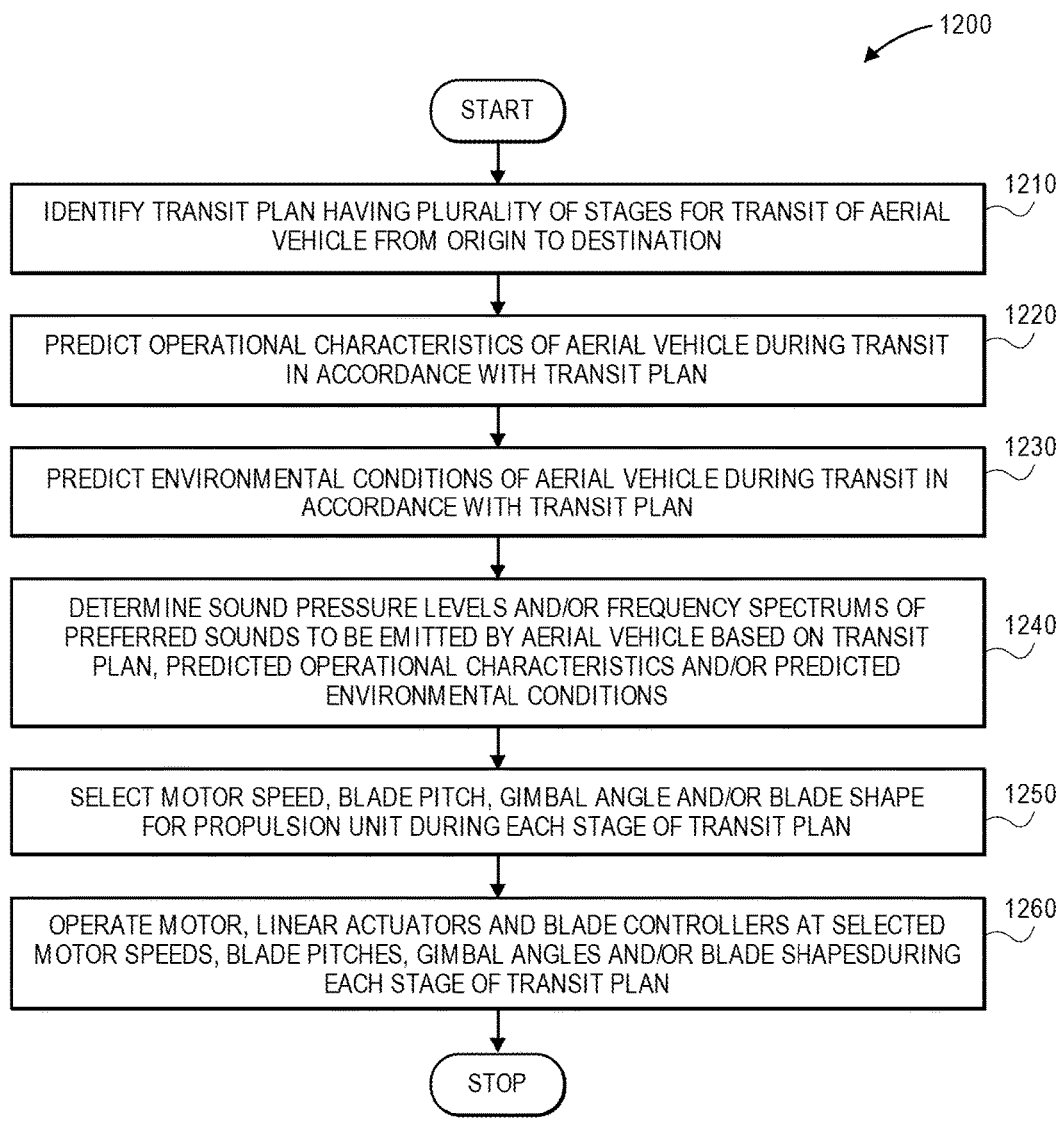
FIG. 12 is a flow chart of one process for operating an aerial vehicle having one or more embodiments of propulsion units in accordance with the present disclosure.

Referring to FIG. 12, a flow chart 1200 of one process for operating an aerial vehicle having one or more embodiments of propulsion units in accordance with the present disclosure is shown. At box 1210, a transit plan for a transit of an aerial vehicle from an origin to a destination having a plurality of stages is identified. For example, the transit plan may comprise information regarding a mission to be performed by the aerial vehicle, including but not limited to dates or times at which the aerial vehicle is to depart from or arrive at an origin, a destination, or one or more intervening waypoints, or actions or evolutions to be performed by the aerial vehicle at the origin, at the destination, or at the waypoints, or while in transit.

At box 1220, operational characteristics of the aerial vehicle during the transit in accordance with the transit plan, e.g., courses or speeds of the aerial vehicle, and corresponding instructions to be provided to such motors, rotors, rudders, ailerons, flaps or other features of the aerial vehicle in order to achieve such courses or speeds, are predicted. At box 1230, environmental conditions to be encountered by the aerial vehicle during the transit in accordance with the transit plan are predicted. For example, weather forecasts for the times or dates of the departure or the arrival of the aerial vehicle, and for the locations of the origin or the destination, may be identified on any basis.

At box 1240, sound pressure levels and/or frequency spectrums of preferred sounds to be emitted by the aerial vehicle during the transit are determined based at least in part on the transit plan identified at box 1210, the operational characteristics (e.g., courses, speeds, lift, thrust, maneuverability, efficiency) predicted at box 1220, or the environmental conditions (e.g., temperatures, pressures, humidities, wind speeds, directions, measures of cloud coverage, sunshine, or surface conditions or textures of an environment between and including the origin and the destination) predicted at box 1230. For example, information or data regarding the transit plan, the predicted operational characteristics or the predicted environmental conditions may be provided to a trained machine learning system as initial inputs. The machine learning system may utilize one or more algorithms or techniques such as nearest neighbor methods or analyses, factorization methods or techniques, K-means clustering analyses or techniques, similarity measures such as log likelihood similarities or cosine similarities, latent Dirichlet allocations or other topic models, or latent semantic analyses, and may be trained to select preferred sound pressure levels and/or frequency spectrums to be emitted during one or more stages of the transit plan, or as the aerial vehicle operates in accordance with the predicted operating characteristics or within the predicted environmental conditions. In some embodiments, the trained machine learning system resides and/or operates on one or more computing devices or machines provided onboard the aerial vehicle. In some other embodiments, the trained machine learning system resides in one or more alternate or virtual locations, e.g., in a "cloud"-based environment accessible via a network.

At box 1250, one or more of a motor speed, a blade pitch, a gimbal angle and/or a blade shape is selected for each stage of the transit plan based at least in part on the sound pressure levels and/or frequency spectrums of the preferred sounds to be emitted by the aerial vehicle during operation. For example, a schedule or list of computer-executable instructions to be provided to a motor, to one or more linear actuators or to one or more blade controllers may be defined and stored in one or more data stores, e.g., onboard the aerial vehicle or in one or more external, accessible locations. In some embodiments, the instructions may be executed at a predetermined time, or when the aerial vehicle arrives at a predetermined location. In some other embodiments, the instructions may be executed when the aerial vehicle encounters a predetermined environmental condition, when the aerial vehicle reaches an operational milestone or upon an occurrence of a predetermined event. At box 1260, a motor, one or more linear actuators and/or one or more blade controllers are operated to emit the preferred sounds during each stage of the transit plan, and the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Those of ordinary skill in the pertinent arts will recognize that the propulsion units of the present disclosure may include any number of motors of any type, as well as any number of propellers of any type (e.g., propellers having any number of blades of any size or shape), any number of actuators for modifying gimbal angles or blade pitch angles, or any number of blade controllers for modifying blade shapes. Moreover, those of ordinary skill in the pertinent arts will further recognize that an aerial vehicle may include any number of the propulsion units of the present disclosure.

For example, those of ordinary skill in the pertinent arts will also recognize that the systems and methods disclosed herein may be utilized in connection with any type or form of aerial vehicle (e.g., manned or unmanned) having fixed or rotating wings and having any intended industrial, commercial, recreational or other use. In particular, although some of the embodiments disclosed herein reference propellers having two blades or four blades, or aerial vehicles having four propulsion units having one motor and one propeller each, those of ordinary skill in the pertinent arts will recognize that the systems and methods of the present disclosure may be utilized in connection with propellers having any number of blades, and in connection with aerial vehicles having any number of propulsion units with any number of motors or propellers (e.g., for redundancy). Moreover, although some of the embodiments disclosed herein reference the use of propellers on aerial vehicles, those of ordinary skill in the pertinent arts will recognize that the systems and methods of the present disclosure may be utilized in connection with seagoing vessels, as well.

Furthermore, those of ordinary skill in the pertinent arts will recognize that the systems and methods disclosed herein may be used to cause an aerial vehicle to radiate sounds at predetermined sound pressure levels and/or within predetermined frequency spectrums. By controlling the operation of a plurality of propulsion units, e.g., by individually controlling motor speeds, gimbal angles, blade pitch angles or blade shapes of such units, an aerial vehicle may effectively emit a specific sound, as desired, while meeting a demand for force (e.g., thrust and/or lift).

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 10 through 12, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   a frame;
   a propulsion unit mounted to the frame, wherein the propulsion unit comprises a motor configured to operate at a plurality of speeds and a propeller rotatably coupled to the motor by a drive shaft, wherein the propeller has a plurality of blades mounted to a hub;
   at least one acoustic sensor; and
   a computing device having a memory and one or more computer processors,
   wherein the computing device is configured to:

determine a first force to be supplied to the unmanned aerial vehicle by the propulsion unit;
select a first set of attributes to operate the propulsion unit to supply the first force, wherein the first set of attributes comprises a first speed of the motor and a first gimbal angle of the drive shaft;
initiate a first operation of the propulsion unit in accordance with the first set of attributes at a first time;
capture, by the at least one acoustic sensor, information regarding sound radiating from the unmanned aerial vehicle during the first operation;
determine a second set of attributes to operate the motor based at least in part on the information regarding the sound, wherein the second set of attributes comprises at least one of a second speed for the motor or a second gimbal angle for the first drive shaft; and
initiate a second operation of the propulsion unit in accordance with the second set of attributes at a second time,
wherein the second time is not earlier than the first time.

2. The unmanned aerial vehicle of claim 1, wherein the information regarding the sound comprises a sound pressure level of the sound and a frequency spectrum of the sound, and
wherein the computing device is further configured to at least:
select the second speed based at least in part on the sound pressure level or the frequency spectrum of the sound.

3. The unmanned aerial vehicle of claim 1,
wherein the first set of attributes comprises a first pitch angle of at least one blade of the propeller, and
wherein the second set of attributes comprises a second pitch angle of the at least one blade of the propeller.

4. The unmanned aerial vehicle of claim 1,
wherein the first set of attributes comprises a first shape of at least one blade of the propeller, and
wherein the second set of attributes comprises a second shape of the at least one blade of the propeller.

5. A method to operate an aerial vehicle having a propulsion unit comprising a motor and a propeller coupled to the motor by a drive shaft, the method comprising:
operating the propulsion unit with the drive shaft aligned at a first gimbal angle and the motor rotating at a first speed at a first time;
selecting at least one of a second gimbal angle for the drive shaft or a second speed for the motor; and
at least one of:
aligning the drive shaft at the second gimbal angle at a second time; or
causing the motor to rotate at the second speed at the second time.

6. The method of claim 5, wherein the aerial vehicle further comprises at least one sensor, and wherein the method further comprises:
determining information regarding at least one sound emitted by the aerial vehicle at a third time using the at least one sensor, wherein the information regarding the at least one sound comprises at least one of a sound pressure level of the at least one sound or a frequency spectrum of the at least one sound; and
in response to determining the information regarding the at least one sound emitted by the aerial vehicle at the third time,
selecting the at least one of the second gimbal angle for the drive shaft or the second speed for the motor based at least in part on the information regarding the at least one sound at the third time.

7. The method of claim 5, further comprising:
determining information regarding at least one of a desired velocity or a desired acceleration of the aerial vehicle at the second time; and
in response to determining the information regarding the at least one of the desired velocity or the desired acceleration of the aerial vehicle at the second time,
selecting the at least one of the second gimbal angle for the drive shaft or the second speed for the motor based at least in part on the information regarding the at least one of the desired velocity or the desired acceleration of the aerial vehicle at the second time.

8. The method of claim 5, further comprising:
identifying information regarding a mission for the aerial vehicle;
determining at least one attribute of the mission for the aerial vehicle; and
selecting the at least one of the second gimbal angle or the second speed based at least in part on the at least one attribute.

9. The method of claim 8,
wherein the at least one attribute is at least one of:
a location of an origin for the mission;
a location of a destination for the mission;
a dimension or a mass of a payload for the mission;
an anticipated environmental condition to be encountered by the aerial vehicle during the mission;
an anticipated operational characteristic of the aerial vehicle during the mission; or
an anticipated sound to be emitted by the aerial vehicle during the mission.

10. The method of claim 5, wherein each of a plurality of blades of the propeller is aligned at a first pitch angle at the first time, and
wherein the method further comprises:
selecting a second pitch angle for each of the plurality of blades of the propeller; and
aligning each of the plurality of blades at the second pitch angle at the second time.

11. The method of claim 10, wherein the propulsion unit comprises a plate element, a gimbaling base and a plurality of linear actuators configured to change a distance between a portion of the plate element and the gimbaling base, and
wherein the method further comprises:
determining, for each of the plurality of linear actuators, a position corresponding to the second gimbal angle or the second pitch angle; and
causing each of the plurality of linear actuators to be placed in the position corresponding to the second gimbal angle or the second pitch angle at the second time.

12. The method of claim 5, wherein the propeller comprises a plurality of blades, and
wherein the method further comprises:
selecting a shape for each of the plurality of blades; and
causing each of the plurality of blades to have the selected shape at the second time.

13. The method of claim 5, wherein the aerial vehicle further comprises at least one sensor, and
wherein the method further comprises:
determining a position of the aerial vehicle at a third time using the at least one sensor, wherein the third time is after the first time and prior to the second time; and in response to determining the position of the aerial vehicle at the third time,
selecting the at least one of the second gimbal angle for the drive shaft or the second speed for the motor based at least in part on the position of the aerial vehicle at the third time.

14. The method of claim 5, wherein the aerial vehicle further comprises at least one sensor, and
wherein the method further comprises:
determining an environmental condition in a vicinity of the aerial vehicle at a third time using the at least one sensor, wherein the third time is after the first time and prior to the second time; and
in response to determining the environmental condition in the vicinity of the aerial vehicle at the third time,
selecting the at least one of the second gimbal angle for the drive shaft or the second speed for the first motor based at least in part on the environmental condition in the vicinity of the aerial vehicle at the third time,
wherein the environmental condition in the vicinity of the aerial vehicle at the third time comprises at least one of:
a temperature;
a pressure;
a humidity;
a wind speed;
a wind direction;
a weather event;
a level of cloud coverage;
a level of sunshine; or
a surface condition.

15. The method of claim 5, wherein the aerial vehicle further comprises at least one sensor, and wherein the method further comprises:
determining an operational characteristic of the aerial vehicle at a third time using the at least one sensor, wherein the third time is after the first time and prior to the second time; and
in response to determining the operational characteristic of the aerial vehicle at the third time,
selecting the at least one of the second gimbal angle for the drive shaft or the second speed for the motor based at least in part on the operational characteristic of the aerial vehicle at the third time,
wherein the operational characteristic of the aerial vehicle at the third time is at least one of:
an altitude;
a course;
an air speed;
a climb rate;
a descent rate;
a turn rate; or
an acceleration.

16. A method for causing an aerial vehicle to travel from an origin to a destination by way of at least one intervening waypoint, wherein the aerial vehicle comprises a propulsion unit having a motor and a propeller rotatably coupled to the motor by a drive shaft, the method comprising:
defining a first operating mode for the propulsion unit during a first segment between a location of the origin and a location of the at least one intervening waypoint, wherein the first operating mode is defined based at least in part on the location of the origin, the location of the at least one intervening waypoint, and at least a first sound restriction in effect between the location of the origin and the location of the at least one intervening waypoint, wherein the first operating mode comprises a first speed of the motor and a first gimbal angle of the propeller;
defining a second operating mode for the propulsion unit during a second segment between the location of the at least one intervening waypoint and a location of the destination, wherein the second operating mode is defined based at least in part on the location of the at least one intervening waypoint, the location of the destination, and at least a second sound restriction in effect between the location of the at least one intervening waypoint and the location of the destination, wherein the second operating mode comprises a second speed of the motor and a second gimbal angle of the propeller; and
causing the propulsion unit to operate in accordance with the first operating mode at the location of the origin.

17. The method of claim 16, further comprising:
determining, by at least one position sensor, that the aerial vehicle has arrived at the location of the at least one intervening waypoint; and
in response to determining that the aerial vehicle has arrived at the location of the at least one intervening waypoint,
causing the propulsion unit to operate in accordance with the second operating mode.

18. The method of claim 17, wherein the propulsion unit further comprises a plate element, a gimbaling base and three independently operable linear actuators joined to a perimeter of the plate element and a perimeter of the gimbaling base,
wherein the propeller is rotatably joined to the plate element,
wherein the first operating mode comprises a first position of each of the three independently operable linear actuators,
wherein the second operating mode comprises a second position of each of the three independently operable linear actuators, and
wherein causing the propulsion unit to operate in accordance with the second operating mode comprises:
adjusting each of the three independently operable linear actuators from the first position to the second position.

19. The method of claim 16, wherein the first operating mode further comprises a first shape of each of a plurality of blades of the propeller.

20. The method of claim 16, wherein the first operating mode further comprises a first pitch angle of each of a plurality of blades of the propeller.

* * * * *